United States Patent
Yanai

(10) Patent No.: US 8,474,570 B2
(45) Date of Patent: Jul. 2, 2013

(54) ELECTRIC POWER STEERING APPARATUS

(75) Inventor: Kohei Yanai, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/501,212

(22) PCT Filed: Dec. 25, 2009

(86) PCT No.: PCT/JP2009/071888
§ 371 (c)(1),
(2), (4) Date: Apr. 10, 2012

(87) PCT Pub. No.: WO2011/077589
PCT Pub. Date: Jun. 30, 2011

(65) Prior Publication Data
US 2012/0211299 A1   Aug. 23, 2012

(51) Int. Cl.
*B62D 5/04*   (2006.01)
(52) U.S. Cl.
USPC .................. 180/446; 180/443; 701/41
(58) Field of Classification Search
USPC ............ 180/443, 444, 446; 701/41, 42
See application file for complete search history.

(56) References Cited

U.S. PATENT DOCUMENTS

| 7,294,988 B2 * | 11/2007 | Ajima et al. ............... 318/712 |
| 7,694,777 B2 | 4/2010 | Yamashita et al. |
| 2007/0046249 A1 | 3/2007 | Tomigashi et al. |
| 2008/0035411 A1 | 2/2008 | Yamashita et al. |

FOREIGN PATENT DOCUMENTS

| JP | 2000 209888 | 7/2000 |
| JP | 2005 296095 | 10/2005 |
| JP | 2008 37399 | 2/2008 |
| JP | 2009 291072 | 12/2009 |

OTHER PUBLICATIONS

International Search Report Issued May 11, 2010 in PCT/JP09/71888 Filed Dec. 25, 2009.

* cited by examiner

*Primary Examiner* — Kevin Hurley
*Assistant Examiner* — Marc A Scharich
(74) *Attorney, Agent, or Firm* — Oblon, Spivak, McClelland, Maier & Neustadt, L.L.P.

(57) ABSTRACT

An electrical angle estimation section calculates an estimative electrical angle on the basis of an inductive voltage generated in a motor, and obtains an estimative electrical angle by correcting the estimative electrical angle by an electrical angle correction amount. On the basis of a detection value which represents the difference in electrical angle between the q-axis and the δ-axis calculated by an electrical-angle-error detection section, an electrical-angle-correction-amount computation section calculates an electrical angle correction amount such that the electrical angle of the δ-axis falls within a prescribed angular range, which lags behind the q-axis in terms of electrical angle. Thus, when sensorless control is performed, a phenomenon in which the motor loses synchronism can be restrained.

8 Claims, 17 Drawing Sheets

United States Patent US 8,474,570 B2

ELECTRIC POWER STEERING APPARATUS

TECHNICAL FIELD

The present invention relates to an electric power steering apparatus which drives and controls an electric motor in accordance with a driver's steering operation, to thereby generate steering assist torque.

BACKGROUND ART

Conventionally, an electric power steering apparatus includes an electric motor for assisting a driver's steering wheel operation, and an electronic control unit (hereinafter referred to as the "ECU") for driving and controlling the electric motor while setting a target assist torque corresponding to a steering torque applied to the steering wheel by the driver. An electric power steering apparatus which employs a brushless DC motor as the electric motor is also widely used. In such a brushless DC motor, electricity is supplied to U-phase, V-phase, and W-phase coils through switching control of an inverter. The brushless DC motor is driven through current vector control which uses a d-q coordinate system. The d-axis of the coordinate system corresponds to the penetrating direction of a magnetic field of a permanent magnet provided on a rotor of the motor, and the q-axis of the coordinate system is orthogonal to the d-axis. Accordingly, in the case where such a brushless DC motor is used, a rotational angle sensor is provided so as to detect the electrical angle of the rotor.

When the rotational angle sensor fails, control of the motor becomes impossible. An electric power steering apparatus which can solve this problem has been known (for example, see Japanese Patent Application Laid-Open (kokai) No. 2008-37399). When the rotational angle sensor fails, the known electric power steering apparatus estimates the electrical angle from an inductive voltage (counter electromotive force) generated in the motor, and drives and controls the motor through use of the estimated electrical angle (estimative electrical angle). Motor control which utilizes such an estimative electrical angle is called sensorless control. When the sensorless control is performed, an ECU estimates the d-axis and the q-axis on the basis of the estimative electrical angle, and performs current vector control through use of the estimated d-q coordinate system. The estimated d-axis for control will be referred to as the "γ-axis," and the estimated q-axis for control will be referred to as the "δ-axis."

DISCLOSURE OF THE INVENTION

In the case where a motor is driven by current vector control which uses such a d-q coordinate system, in order to efficiently drive the motor, electricity is supplied to the motor coils such that its permanent magnet is pulled toward the q-axis direction. That is, current is supplied to the motor coils such that the current vector coincides with the q-axis direction in the d-q coordinate system. FIG. 16 shows the relation between the direction of the current vector (electrical angle) and assist torque (motor torque). The assist torque is zero when the direction of the current vector coincides with the d-axis direction, and becomes maximum when the direction of the current vector coincides with the q-axis direction, which is advanced from the d-axis direction by an electrical angle of 90° (position P1 in FIG. 16). Accordingly, when electricity is supplied to the motor coils such that the current vector coincides with the q-axis direction, the motor can be driven most efficiently. In this case, the quantity of electricity supplied to the motor coils is controlled such that, as shown in FIG. 17, a combined force of an assist torque Tm and a driver's steering force Ts balances with an axial force F. This axial force F refers to a force required to displace a steering rack.

However, sensorless control has the following problem. When electricity is supplied to the motor coils such that the current vector coincides with the q-axis direction, in some cases, the motor loses synchronism because of a disturbance such as fluctuation of the axial force. The axial force fluctuates at all times. When the axial force increases sharply and the assist torque generated by the motor becomes insufficient, the rotor is rotated in a direction opposite the steering direction. In such a case, if the rotational angle sensor is normal, the current vector can be maintained to coincide with the q-axis direction, because the electrical angle corresponding to rotation of the rotor can be detected. However, in the case of sensorless control, because of difficulty in accurately estimating the electrical angle which changes with rotation of the rotor, it is difficult to maintain the direction of the current vector to coincide with the q-axis direction. Therefore, when the direction of the current vector leads the q-axis as is indicated by an arrow in FIG. 16, the assist torque decreases. Accordingly, the reverse rotation of the motor is promoted further. As a result, the direction of the current vector enters a reverse assist region which is advanced 180° or more from the d-axis, whereby the motor loses synchronism, and the steering wheel vibrates.

The present invention has been accomplished so as to solve the above-described problem, and its object is to restrain a phenomenon in which a motor loses synchronism, which phenomenon may occur in the case where sensorless control is performed.

In order to achieve the above-described object, the present invention provides an electric power steering apparatus which comprises a permanent magnet synchronous motor (20) provided in a steering mechanism (10) and adapted to generate steering assist torque; a rotational angle sensor (22, 120) for detecting an electrical angle of the permanent magnet synchronous motor; sensor anomaly detection means (121) for detecting an anomaly of the rotational angle sensor; electrical angle estimation means (110), operable when the anomaly of the rotational angle sensor is detected by the sensor anomaly detection means, for estimating the electrical angle of the permanent magnet synchronous motor on the basis of an inductive voltage generated in the permanent magnet synchronous motor; and motor control means (101, 102, 103, 105, 106, 30, 39, 122) for driving and controlling the permanent magnet synchronous motor. When the anomaly of the rotational angle sensor is not detected, the motor control means drives and controls the permanent magnet synchronous motor by performing current vector control while using a d-q coordinate system having a d-axis and a q-axis determined on the basis of the electrical angle detected by the rotational angle sensor, the d-axis coinciding with an extending direction of a magnetic field of a permanent magnet of the permanent magnet synchronous motor and the q-axis being orthogonal to the d-axis. When the anomaly of the rotational angle sensor is detected, the motor control means drives and controls the permanent magnet synchronous motor by performing current vector control while using a γ-δ coordinate system having a γ-axis and a δ-axis estimated as the d-axis and the q-axis, respectively, on the basis of the estimative electrical angle estimated by the electrical angle estimation means. The electric power steering apparatus is characterized by comprising electrical-angle-difference detection means (117 or 117') for detecting a γ-axis inductive voltage, which is an inductive voltage generated in the γ-axis direction of the permanent magnet synchronous motor and for detecting a difference in electrical angle between the q-axis and the δ-axis on the basis of at least the γ-axis inductive voltage; and estimative-electrical-angle correction means (115, 118, or 118') for correcting the estimative electrical angle estimated by the electrical angle estimation means, on the basis of the electrical angle difference detected by the electrical-angle-difference detection means, such that the electrical angle of the δ-axis lags behind the electrical angle of the q-axis.

In the electric power steering apparatus of the present invention, a permanent magnet synchronous motor is provided in the steering mechanism. The motor control means drives and controls this permanent magnet synchronous motor to thereby generate a steering assist torque. The motor control means drives and controls the motor by performing current vector control while using a d-q coordinate system having a d-axis and a q-axis determined on the basis of the electrical angle detected by the rotational angle sensor. The d-axis coincides with an extending direction of a magnetic field of a permanent magnet of the permanent magnet synchronous motor (hereinafter simply referred to as the motor). The q-axis is orthogonal to the d-axis (is a direction advanced from the d-axis by an electrical angle of π/2). In this case, for example, the motor control means detects a steering torque input from a steering wheel to a steering shaft, sets a target assist torque corresponding to the steering torque, and controls the current flowing through the motor such that the motor generates the target assist torque.

In the case where the rotational angle sensor fails, such current vector control cannot be performed. In order to overcome such a drawback, the electric power steering apparatus of the present invention includes sensor anomaly detection means for detecting an anomaly of the rotational angle sensor; and electrical angle estimation means for estimating the electrical angle of the motor when the anomaly of the rotational angle sensor is detected by the sensor anomaly detection means. The electrical angle estimation means estimates the electrical angle of the motor on the basis of the inductive voltage generated in the motor. The inductive voltage generated in the motor is proportional to the angular velocity of the motor. Accordingly, for example, the electrical angle estimation means obtains an estimative angular velocity of the motor from the inductive voltage, and advances the electrical angle in the rotational direction by an amount by which the motor rotates at the estimative angular velocity, whereby the estimative electrical angle can be calculated. In this case, the motor control means drives and controls the motor by performing current vector control while using a γ-δ coordinate system whose γ-axis is estimated as the d-axis and whose δ-axis is estimated as the q-axis. That is, the motor control means performs sensorless control.

The motor control means can drive the motor at the maximum torque efficiency by supplying current to the motor coils such that the current vector coincides with the q-axis direction. However, in the case of sensorless control, it is difficult to maintain the current vector in a state in which the current vector accurately coincides with the q-axis direction. Therefore, in the case where the axial force increases sharply and the rotor of the motor is rotated in a direction opposite a steering direction, the direction of the current vector leads the q-axis, and the torque generated by the motor decreases. As a result, the motor becomes likely to lose synchronism.

In view of this, in the electric power steering apparatus of the present invention, when sensorless control is performed, the estimative electrical angle is corrected such that the electrical angle of the δ-axis lags behind the electrical angle of the q-axis; that is, the δ-axis is oriented in a direction which lags behind the q-axis in terms of electrical angle. By virtue of such correction, when the axial force increases sharply and the rotor rotates in the reverse direction, the steering assist torque by the motor increase. Thus, the reverse rotation of the rotor is restrained.

In order to realize such a correction operation, the electric power steering apparatus of the present invention includes electrical-angle-difference detection means and estimative-electrical-angle correction means. The electrical-angle-difference detection means detects a γ-axis inductive voltage, which is an inductive voltage generated in the γ-axis direction of the motor, and detects a difference in electrical angle between the q-axis and the δ-axis on the basis of at least the γ-axis inductive voltage. The inductive voltage of the motor is generated only in the q-axis direction. Accordingly, the γ-axis inductive voltage generated in the direction of the γ-axis, which is estimated as the d-axis, becomes zero when the δ-axis and the q-axis coincide with each other. When the δ-axis lags behind the q-axis and when the δ-axis leads the q-axis, the γ-axis inductive voltage assumes non-zero values, whose magnitudes correspond to the difference between the γ-axis and the q-axis and which differ in sign from each other. Accordingly, the difference between the electrical angle of the actual q-axis and the electrical angle of the δ-axis, which is estimated as the q-axis, can be detected from the γ-axis inductive voltage.

The estimative-electrical-angle correction means corrects the estimative electrical angle estimated by the electrical angle estimation means, on the basis of the electrical angle difference detected by the electrical-angle-difference detection means, such that the electrical angle of the δ-axis lags behind the electrical angle of the q-axis. Accordingly, as a result of the correction of the estimative electrical angle, the direction of the current vector in the γ-δ coordinate system is controlled such that it coincides with a direction lagging behind the actual q-axis in terms of electrical angle. With this control, even when the axial force fluctuates, the motor is unlikely to lose synchronism. As a result, the robustness of the motor against loss of synchronism can be enhanced.

Another feature of the present invention resides in that the above-described estimative-electrical-angle correction means corrects the estimative electrical angle estimated by the electrical angle estimation means such that the electrical angle of the δ-axis falls within a prescribed angular range (A) lagging behind the q-axis in terms of electrical angle. In this case, preferably, the electrical-angle-difference detection means outputs a detection value (eγ or eγ/e) corresponding to the difference in electrical angle between the q-axis and the δ-axis; and the estimative-electrical-angle correction means sets a dead zone (Z or Z') for the detection value output from the electrical-angle-difference detection means, the dead zone corresponding to the prescribed angular range. When the detection value deviates from the dead zone, the estimative-electrical-angle correction means corrects the estimative electrical angle estimated by the electrical angle estimation means such that the electrical angle of the δ-axis falls within the prescribed angular range.

In the present invention, the estimative-electrical-angle correction means corrects the estimative electrical angle such that the electrical angle of the δ-axis falls within a prescribed angular range lagging behind the q-axis in terms of electrical angle. The angular range is a range of electrical angle set in advance such that the robustness of the motor against loss of synchronism is maintained satisfactory, while the motor torque efficiency is maintained at a necessary minimum level. The angular range is set by the dead zone set for the detection value output from the electrical-angle-difference detection means. In the case where the detection value deviates from the dead zone, the electrical-angle correction means assumes that the electrical angle of the δ-axis does not fall within the prescribed angular range, and corrects the estimative electrical angle such that the electrical angle of the δ-axis falls within the prescribed angular range. Accordingly, by means of setting the dead zone, the electrical angle of the δ-axis can be caused to stay within the prescribed angular range. Notably, the "detection value corresponding to the difference in electrical angle between the q-axis and the δ-axis" may be the γ-axis inductive voltage, or a value relating to the γ-axis inductive voltage, such as the ratio of the γ-axis inductive voltage to the actual inductive voltage generated in the motor.

Another feature of the present invention resides in that the above-mentioned estimative-electrical-angle correction means sets a correction sensitivity, which represents the ratio of an amount by which the estimative electrical angle is corrected to an amount of deviation of the detection value from the dead zone. Specifically, when the electrical angle of the δ-axis leads the prescribed angular range, the estimative-electrical-angle correction means sets the correction sensitivity to be higher than that in the case where the electrical angle of the δ-axis lags behind the prescribed angular range.

In the present invention, when the electrical angle of the δ-axis leads the prescribed angular range, the correction sensitivity of the estimative electric angle is set to be higher than that in the case where the electrical angle of the δ-axis lags behind the prescribed angular range. Therefore, in the case where the electrical angle of the δ-axis enters a region where the motor is likely to lose synchronism, the estimative electric angle can be quickly corrected, whereby the loss of synchronism of the motor can be avoided quickly. Meanwhile, in the case where the electrical angle of the δ-axis enters a region where the motor torque efficiency is low, the motor torque efficiency can be increased by correcting the estimative electrical angle at a stable control speed.

Another feature of the present invention resides in that the above-mentioned estimative-electrical-angle correction means sets an upper limit for the amount by which the estimative electrical angle is corrected. Specifically, when the electrical angle of the δ-axis leads the prescribed angular range, the estimative-electrical-angle correction means sets the upper limit to a greater value as compared with the case where the electrical angle of the δ-axis lags behind the prescribed angular range.

In the present invention, an upper limit is set for the amount by which the estimative electrical angle is corrected. That is, although the correction amount of the estimative electrical angle is set such that the correction amount increases with the amount of deviation of the detection value from the dead zone, its upper limit is set. When the electrical angle of the δ-axis leads the prescribed angular range, the upper limit is set to a greater value, as compared with the case where the electrical angle of the δ-axis lags behind the prescribed angular range. Therefore, in the case where the electrical angle of the δ-axis enters a region where the motor is likely to lose synchronism, the estimative electric angle can be quickly corrected, whereby the loss of synchronism of the motor can be avoided quickly. Meanwhile, in the case where the electrical angle of the δ-axis enters a region where the motor torque efficiency is low, the motor torque efficiency can be increased by correcting the estimative electrical angle at a stable control speed.

Another feature of the present invention resides in that the prescribed angular range (A) is an angular range extending from a first electrical angle which lags behind the q-axis by a minimum angle ($\theta$min) to a second electrical angle which lags behind the q-axis by a maximum angle ($\theta$max), and an angular range extending from the q-axis to the first electrical angle is narrower than the prescribed angular range.

In the present invention, a range extending from the first to second electrical angles set in advance is defined as the prescribed angular range. The angular range extending from the q-axis to the first electrical angle is set to be narrower than the prescribed angular range. Accordingly, it is possible to maintain the motor torque efficiency as high as possible, while restraining the loss of synchronism of the motor.

Another feature of the present invention resides in that the above-mentioned second electrical angle is set within a range where a previously required steering assist performance can be attained.

As the δ-axis separates from the q-axis, the motor torque efficiency decreases. In view of this, in the present invention, by the prescribed angular range, an upper limit angle for operation of delaying the electrical angle of the δ-axis in relation to the q-axis is set as the second electrical angle. The second electrical angle is set within a range where a previously required steering assist performance can be attained. Accordingly, it is possible to secure the necessary lowest assist performance while restraining the loss of synchronism of the motor. Notably, the "previously required steering assist performance" refers to the lowest assist performance required when the sensorless control is performed, and may be lower than the assist performance required in the normal state.

Another feature of the present invention resides in that the above-described motor control means is connected to a steering torque sensor (21) for detecting a steering torque input from a steering wheel to a steering shaft, and drives and controls the permanent magnet synchronous motor so as to generates a target steering assist torque set on the basis of the steering torque detected by the steering torque sensor; and the above-described electrical angle estimation means estimates the rotational direction of the permanent magnet synchronous motor on the basis of the direction of the steering torque detected by the steering torque sensor, and calculates the estimative electrical angle by advancing the electrical angle in the rotational direction by an amount corresponding to the inductive voltage.

In the present invention, the electrical angle estimation means utilizes the information regarding the steering torque used for setting the target steering assist torque, and estimates the rotational direction of the permanent magnet synchronous motor from the direction of the steering torque. Then, the electrical angle estimation means calculates the estimative electrical angle by advancing the electrical angle in the rotational direction by an amount corresponding to the inductive voltage. Accordingly, a dedicated sensor for detecting the rotational direction of the motor is not required, and sensorless control can be performed at low cost. In this case, when the axial force increases sharply and the rotor rotates in the reverse direction, the direction of the steering torque and the rotational direction of the rotor become opposite each other. Therefore, the estimative electrical angle is advanced in the direction opposite the rotational direction of the motor. However, since the estimative electrical angle is corrected such that the δ-axis is oriented in a direction lagging behind the q-axis in terms of electrical angle, the steering assist torque increases. As a result, the reverse rotation of the rotor is restrained, and loss of synchronism of the motor is restrained.

Notably, in the above description, parenthesized reference numerals are provided for facilitating the understanding of the invention, and do not limit the constituent elements of the invention to those of an embodiment which are described through use of the reference numerals.

BEST MODE FOR CARRYING OUT THE INVENTION

Figure 1:
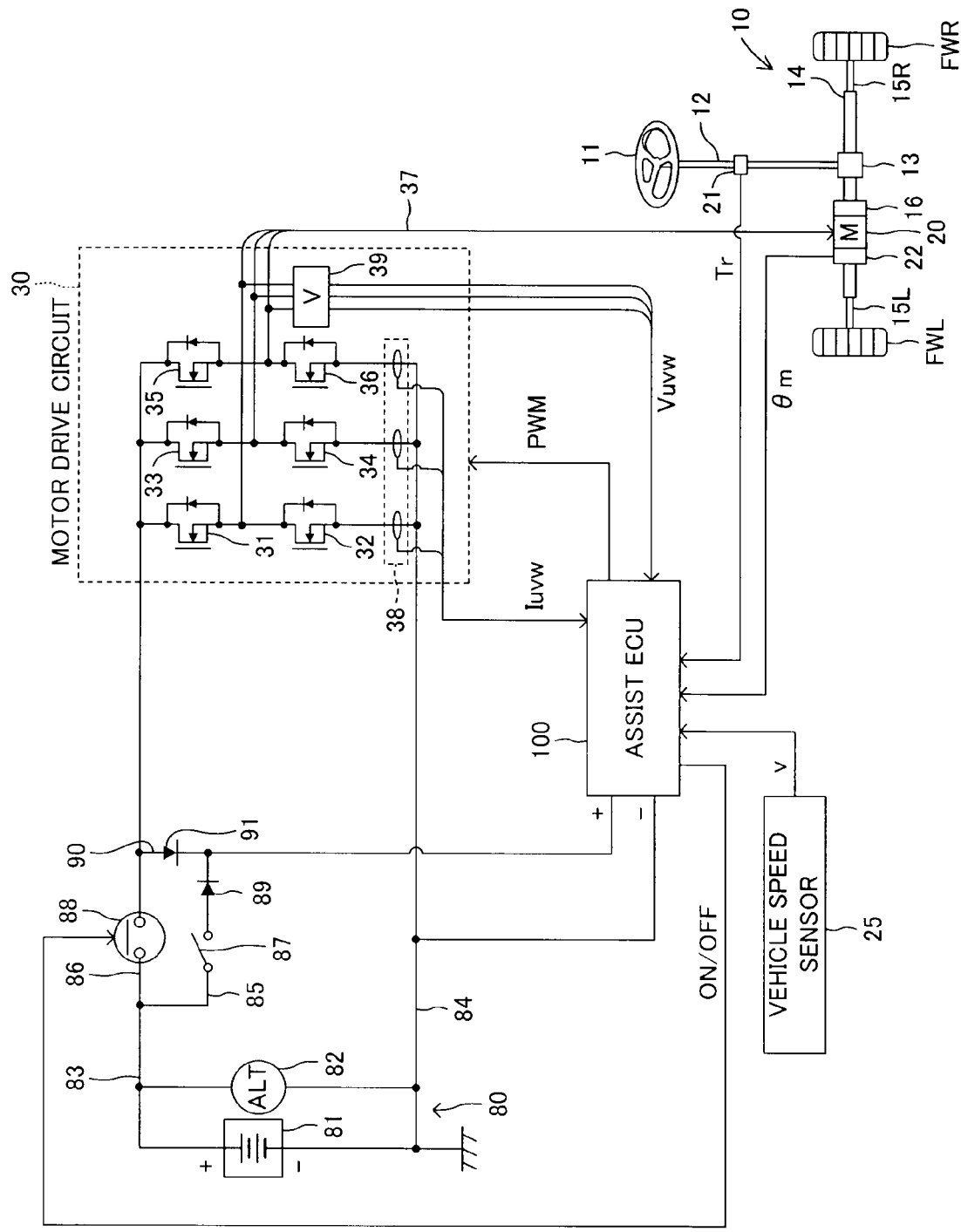
FIG. 1 is a schematic diagram of an electric power steering apparatus according to an embodiment of the present invention.

An electric power steering apparatus according to one embodiment of the present invention will now be described with reference to the drawings. FIG. 1 schematically shows the configuration of an electric power steering apparatus for a vehicle according to the embodiment.

This electric power steering apparatus includes, as a main components, a steering mechanism 10 that steers steerable wheels of a vehicle in response to a driver's turning operation of a steering wheel 11; an electric motor 20 that is assembled into the steering mechanism 10 and that produces a steering assist torque; a motor drive circuit 30 for driving the electric motor 20; and an electronic control unit 100 that controls operation of the electric motor 20. In the following description, the electronic control unit 100 will be referred to the assist ECU 100.

The steering mechanism 10 is a mechanism for steering left and right front wheels FWL and FWR in accordance with the driver's turning operation of the steering wheel 11, and includes a steering shaft 12 that is connected, at its upper end, to the steering wheel 11 for unitary rotation. A pinion gear 13 is connected to the lower end of the steering shaft 12 so as to rotate together with the steering shaft 12. The pinion gear 13 meshes with rack teeth formed in a rack bar 14, whereby a rack-and-pinion mechanism is formed. The knuckles (not shown) of the left and right front wheels FWL and FWR are connected to opposite ends of the rack bar 14 via tie rods 15L and 15R such that the front wheels FWL and FWR can be steered. The left and right front wheels FWL and FWR are steered left and right in accordance with the movement of the rack bar 14 in its axial direction, which is caused by the rotation of the steering shaft 12 about its axis.

The electric motor 20 is assembled to the rack bar 14. The electric motor 20 corresponds to a permanent magnet synchronous motor of the present invention. In the present embodiment, a three-phase brushless DC motor, which is a typical example of such a permanent magnet synchronous motor, is used for the electric motor 20. The rotating shaft of the electric motor 20 (hereinafter simply referred to as the "motor 20") is connected to the rack bar 14 via a ball screw mechanism 16 so that power is transmitted from the motor 20 to the rack bar 14. As a result of rotation of the rotating shaft of the motor 20, a steering force is applied to the left and right front wheels FWL and FWR, to thereby assist the driver's steering operation. The ball screw mechanism 16 serves as a speed reducer and a rotational-linear movement converter. The ball screw mechanism 16 reduces the rotational speed of the motor 20, converts the rotational movement of the motor 20 to a linear movement, and transmits the linear movement to the rack bar 14.

A steering torque sensor 21 is provided on the steering shaft 12. For example, the steering torque sensor 21 detects a torsion angle of a torsion bar (not shown) interposed in an intermediate portion of the steering shaft 12 by a resolver or the like, and detects a steering torque Tr acting on the steering shaft 12 on the basis of the torsion angle. The turning direction of the steering wheel 11 is determined from the sign (positive or negative) of the steering torque Tr. In the present embodiment, the steering torque Tr assumes a positive value when the steering wheel 11 is turned clockwise and a negative value when the steering wheel 11 is turned counterclockwise. Therefore, the magnitude of the steering torque Tr is equal to the absolute value thereof. Notably, in the present embodiment, the torsion angle of the torsion bar is detected by use of a resolver. However, the torsion angle may be detected by use of a rotational angle sensor of a different type such as an encoder.

The motor 20 is provided with a rotational angle sensor 22. This rotational angle sensor 22 is built in the motor 20, and outputs a detection signal corresponding to the rotational angle position of the rotor of the motor 20. The rotational angle sensor 22 is formed of, for example, a resolver. The rotational angle sensor 22 outputs to the assist ECU 100 a detection signal that represents the rotational angle θm of the motor 20. The assist ECU 100 detects the electrical angle θe of the motor 20 from the rotational angle θm. There are the case where the electrical angle θe of the motor 20 is that detected by the rotational angle sensor 22 and the case where the electrical angle θe of the motor 20 is that obtained through estimation to be described later. Therefore, in the case where the two electrical angles must be distinguished from each other, the electrical angle detected by the rotational angle sensor 22 will be called the actual electrical angle θea, and the electrical angle obtained through estimation will be called the estimative electrical angle θeb. In the present embodiment, a resolver is used as the rotational angle sensor 22. However, a rotational angle sensor of a different type such as an encoder may be used.

The motor drive circuit 30 includes six switching elements 31 to 36, each of which is composed of a MOS-FET (Metal Oxide Semiconductor Field Effect Transistor) and which form a three-phase inverter circuit. Specifically, a circuit including a first switching element 31 and a second switching element 32 connected in series, a circuit including a third switching element 33 and a fourth switching element 34 connected in series, and a circuit including a fifth switching element 35 and a sixth switching element 36 connected in series are connected in parallel; and power supply lines 37 extending to the motor 20 are connected to nodes between the upper and lower switching elements (31-32, 33-34, and 35-36) of the respective series circuits.

The motor drive circuit 30 includes a current sensor 38 for detecting currents flowing through the motor 20. This current sensor 38 detects currents flowing through coils of three phases (U-phase, V-phase, and W-phase), and outputs to the assist ECU 100 detection signals representing the detected currents Iu, Iv, and Iw. In the following description, the measured three-phase currents will be collectively referred to as the motor current Iuvw. Also, the motor drive circuit 30 includes a voltage sensor 39 for detecting terminal voltages of the motor 20. The voltage sensor 39 detects terminal voltages of the three phases (U-phase, V-phase, and W-phase), and outputs to the assist ECU 100 detection signals representing the detected voltages Vu, Vv, and Vw. In the following description, the measured three-phase terminal voltages will be collectively referred to as the motor terminal voltage Vuvw.

The switching elements 31 to 36 of the motor drive circuit 30 have respective gates connected to the assist ECU 100, and their duty ratios are controlled by a PWM control signal output from the assist ECU 100. Thus, the drive voltage of the motor 20 is adjusted to a target voltage.

The assist ECU 100 is formed mainly of a microcomputer including a CPU, ROM, RAM, etc. The steering torque sensor 21, the rotational angle sensor 22, the current sensor 38, the voltage sensor 39, and a vehicle speed sensor 25 for detecting vehicle speed are connected to the assist ECU 100. Therefore, the assist ECU 100 receives detection signals representing the steering torque Tr, the rotational angle θm, the motor currents Iu, Iv, Iw, the motor terminal voltages Vu, Vv, Vw, and the vehicle speed v. On the basis of the received detection signals, the assist ECU 100 computes an instruction current to be supplied to the motor 20 such that a steering assist torque (hereinafter simply referred to as the assist torque) optimum for the driver's steering operation is attained, and controls the duty ratios of the switching elements 31 to 36 of the motor drive circuit 30 such that the instruction current flows through the motor 20.

Next, a power supply system of the electric power steering apparatus will be described. The electric power steering apparatus receives electric power from an onboard power supply 80. The onboard power supply 80 includes a main battery 81, which is an ordinary onboard battery having a rated output voltage of 12 V, and an alternator 82 which generates electricity when rotated by an engine and which has a rated output voltage of 14 V. The main battery 81 and the alternator 82 are connected in parallel. A power supply source line 83 and a ground line 84 are connected to the onboard power supply 80. The power supply source line 83 branches into a control system power line 85 and a drive system power line 86. The control system power line 85 functions as a power supply line for supplying electrical power to the assist ECU 100. The drive system power line 86 functions as a power supply line for supplying electrical power to both the motor drive circuit 30 and the assist ECU 100.

An ignition switch 87 is disposed in the control system power line 85. A main power relay 88 is disposed in the drive system power line 86. This main power relay 88 turns on in response to a control signal from the assist ECU 100 to thereby form a circuit for supplying electric power to the motor 20. The control system power line 85 is connected to a power supply+terminal of the assist ECU 100, and a diode 89 is provided in the control system power line 85 to be located on the load side (side toward the assist ECU 100) in relation to the ignition switch 87. This diode 89 is provided in such an orientation that its cathode is located on the side toward the assist ECU 100, and its anode is located on the side toward the onboard power supply 80, and serves as a reverse flow prevention element which allows supply of electricity in the power supply direction only.

The drive system power line 86 has a connection line 90, which branches therefrom at a position located on the load side of the main power relay 88 and is connected to the control system power line 85. This connection line 90 is connected to the control system power line 85 at a point between the diode 89 and the assist ECU 100. A diode 91 is disposed in the connection line 90. This diode 91 is provided in such an orientation that its cathode is located on the side toward the control system power line 85, and its anode is located on the side toward the drive system power line 86. Therefore, although electric power can be supplied from the drive system power line 86 to the control system power line 85 via the connection line 90, electric power cannot be supplied from the control system power line 85 to the drive system power line 86. The drive system power line 86 and the ground line 84 are connected to a power input section of the motor drive circuit 30. Also, the ground line 84 is connected to the ground terminal of the assist ECU 100.

Figure 4:
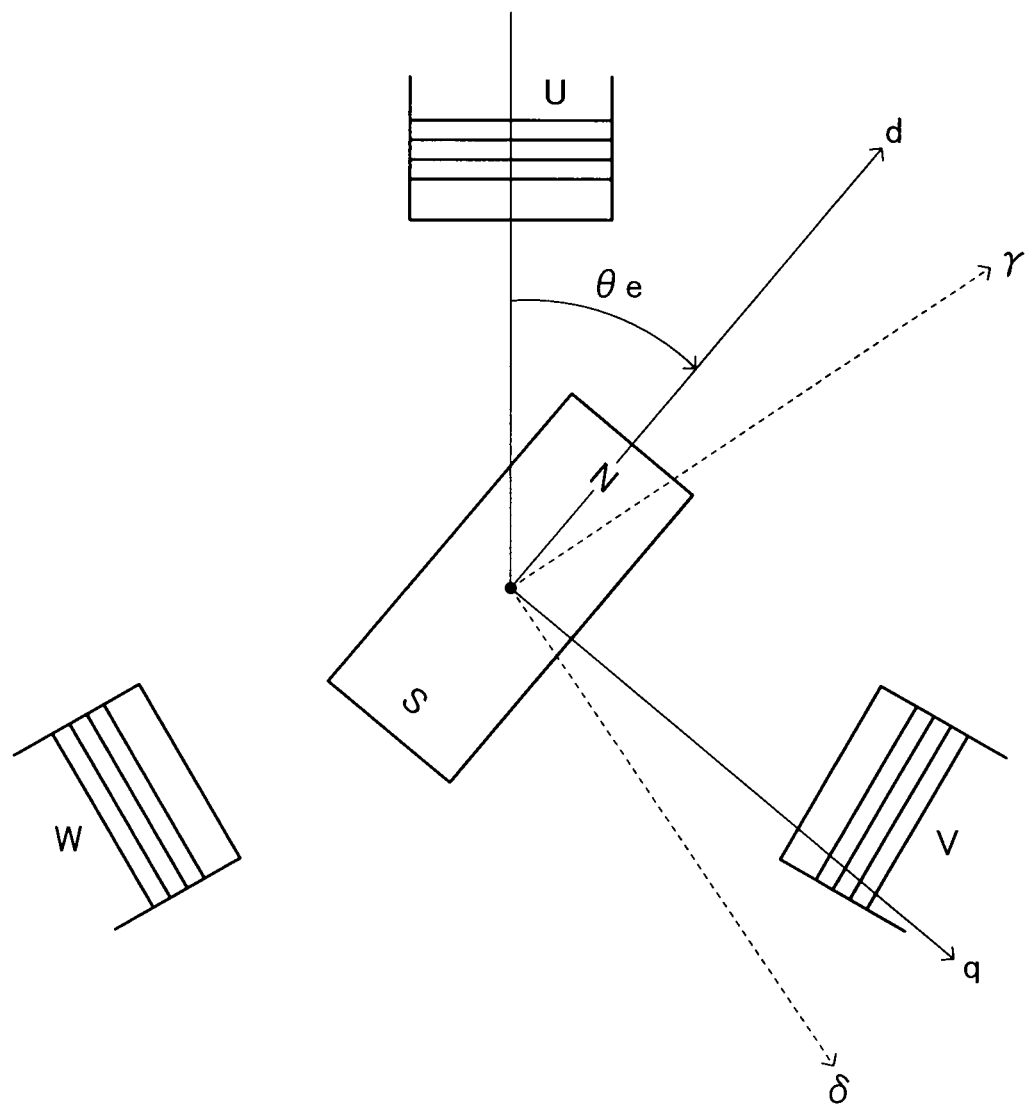
FIG. 4 is an explanatory view used for describing a d-q coordinate system and a γ-δ coordinate system.

Next, control of the motor 20 performed by the assist ECU 100 will be described. As shown in FIG. 4, the assist ECU 100 controls rotation of the motor 20 through current vector control which uses a d-q coordinate system. The d-axis of the coordinate system coincides with the extending direction of a magnetic field of a permanent magnet provided on the rotor of the motor 20, and the q-axis of the coordinate system is orthogonal to the d-axis (the q-axis is advanced from the d-axis by an electrical angle of $\pi/2$). The electrical angle θe is a rotational angle between an axis penetrating the U-phase coil and the d-axis. The d-axis component of the current vector will be referred to as the d-axis current, and the q-axis component of the current vector will be referred to as the q-axis current. The q-axis current generates a magnetic field in the q-axis direction. Accordingly, the q-axis current generates a motor torque. Meanwhile, since the d-axis current generates a magnetic field in the d-axis direction, it cannot generate motor torque, and is used for field-weakening control. In order to attain the maximum motor torque efficiency, the assist ECU 100 controls the current phase such that the current vector moves on the q-axis (the d-axis current is zero).

For such current vector control, the assist ECU 100 determines the d-q coordinate system through detection of the electrical angle θe. This electrical angle θe can be obtained from the rotation angle signal from the rotational angle sensor 22. However, if the rotational angle sensor 22 fails, the electrical angle θe cannot be obtained. In order to overcome such a drawback, the assist ECU 100 is configured such that, when the rotational angle sensor 22 fails, the assist ECU 100 calculates an estimative electrical angle θeb through the processing to be described later, and performs the current vector control by making use of the estimative electrical angle θeb. In this case, an axis which is estimated as the d-axis for control will be called the γ-axis, and another axis which is estimated as the q-axis for control will be called the δ-axis.

Figure 2:
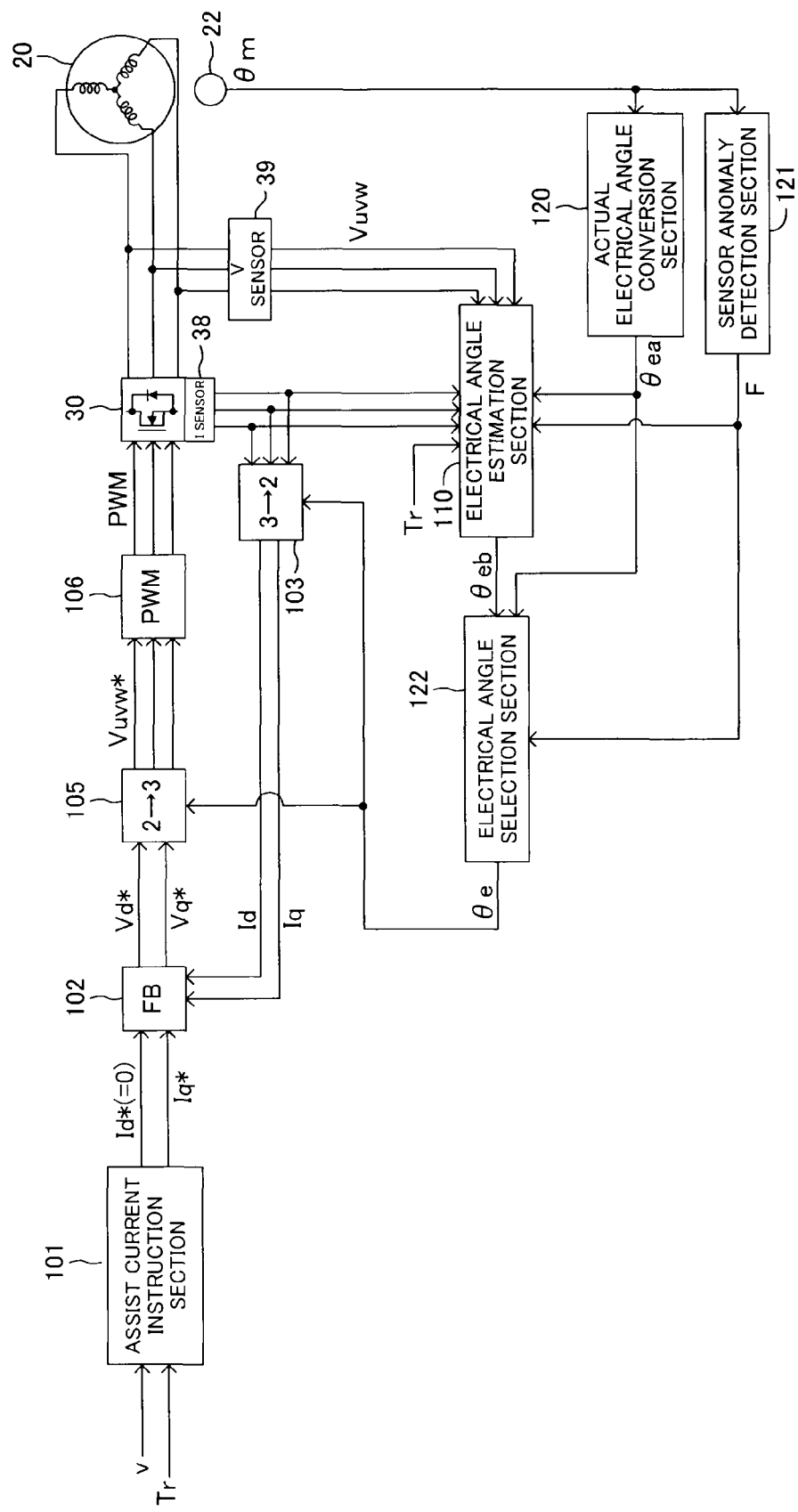
FIG. 2 is a functional block diagram showing the processing of a microcomputer of an assist ECU.
Figure 5:
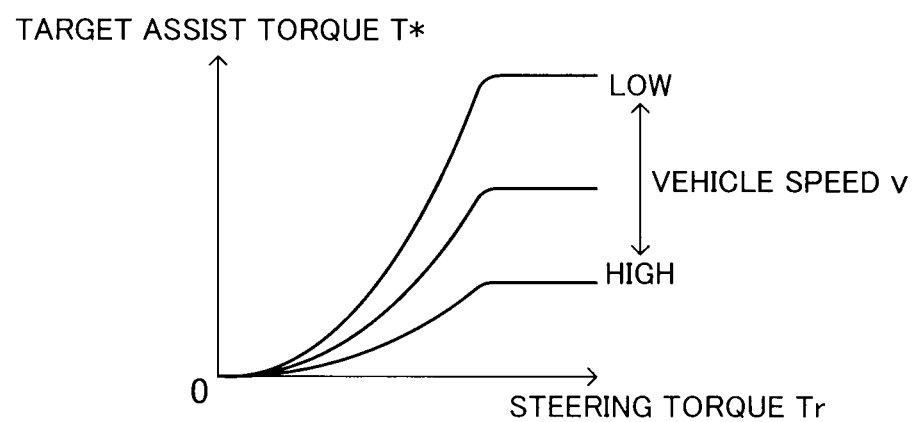
FIG. 5 is a graph showing an assist map.

Next, the function of the assist ECU 100 will be described with reference to FIG. 2. FIG. 2 is a functional block diagram showing functions realized by the program control of the microcomputer of the assist ECU 100. The assist ECU 100 includes an assist current instruction section 101. The assist current instruction section 101 stores an assist map which sets a target assist torque T* in accordance with the steering torque Tr and the vehicle speed v as shown in FIG. 5. The assist current instruction section 101 receives the steering torque Tr output from the steering torque sensor 21 and the vehicle speed v output from the vehicle speed sensor 25, and calculates the target assist torque T* by referring to this assist map. In this case, the target assist torque T* increases as the steering torque Tr increases, and decreases as the vehicle speed v increases. Notably, FIG. 5 shows an assist map for rightward steering, and an assist map for leftward steering is identical with the assist map for rightward steering, except that the signs of the steering torque Tr and the target assist torque T* are inverted (that is, to negative).

The assist current instruction section 101 calculates a q-axis instruction current Iq* in the d-q coordinate system by dividing the calculated target assist torque T* by a torque constant. Also, the assist current instruction section 101 sets the d-axis instruction current Id* to zero (Id*=0).

The q-axis instruction current Iq* and the d-axis instruction current Id* calculated in this manner are output to a feedback control section 102. The feedback control section 102 calculates a deviation ΔIq by subtracting the q-axis actual current Iq from the q-axis instruction current Iq*, and calculates a q-axis instruction voltage Vq* such that the q-axis actual current Iq follows the q-axis instruction current Iq* as a result of proportional-plus-integral control performed through use of the deviation ΔIq. Similarly, the feedback control section 102 calculates a deviation ΔId by subtracting the d-axis actual current Id from the d-axis instruction current Id*, and calculates a d-axis instruction voltage Vd* such that the d-axis actual current Id follows the d-axis instruction current Id* as a result of proportional-plus-integral control performed through use of the deviation ΔId.

The q-axis actual current Iq and the d-axis actual current Id are two-phase currents in the d-q coordinate system converted from the detected currents Iu, Iv, and Iw of three phases actually flowing through the coils of the motor 20. A three-phase/two-phase coordinate conversion section 103 performs the conversion of the three-phase currents Iu, Iv, and Iw to the two-phase currents Id and Iq in the d-q coordinate system. The three-phase/two-phase coordinate conversion section 103 receives the electrical angle θe output from the electrical angle selection section 122, and converts the three-phase currents Iu, Iv, and Iw (detected by the current sensor 38) to the two-phase currents Id and Iq in the d-q coordinate system on the basis of the received electrical angle θe.

A conversion matrix C for conversion from a three-phase coordinate system to a d-q coordinate system is represented by the following Eq. (1).

$$C = \sqrt{\frac{2}{3}} \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix} \quad (1)$$

Notably, as will be described later, the electrical angle selection section 122 outputs the actual electrical angle θea of the motor 20 as the electrical angle θe when an anomaly of the rotational angle sensor 22 is not detected, and outputs the estimative electrical angle θeb of the motor 20 as the electrical angle θe when an anomaly of the rotational angle sensor 22 is detected.

The q-axis instruction voltage Vq* and the d-axis instruction voltage Vd* calculated by the feedback control section 102 are output to a two-phase/three-phase coordinate conversion section 105. The two-phase/three-phase coordinate conversion section 105 converts the q-axis instruction voltage Vq* and the d-axis instruction voltage Vd* to three-phase instruction voltages Vu*, Vv*, and Vw* on the basis of the electrical angle θe output from the electrical angle selection section 122, and outputs the three-phase instruction voltages Vu*, Vv*, and Vw* to a PWM signal generation section 106. The PWM signal generation section 106 outputs PWM control signals corresponding to the three-phase instruction voltages Vu*, Vv*, and Vw* to the switching elements 31 to 36 of the motor drive circuit 30. As a result, the motor 20 is driven, and an assist torque which follows the target assist torque T* is imparted to the steering mechanism 10.

The rotation detection signal output from the rotational angle sensor 22 is supplied to an actual electrical angle conversion section 120 and a sensor anomaly detection section 121. The actual electrical angle conversion section 120 calculates the actual electrical angle θea of the motor 20 from the rotation detection signal output from the rotational angle sensor 22, and outputs the calculated actual electrical angle θea to the electrical angle selection section 122. The rotational angle sensor according to the present invention is composed of the rotational angle sensor 22 and the actual electrical angle conversion section 120. The sensor anomaly detection section 121 detects anomaly of the rotational angle sensor 22 on the basis of the rotation detection signal output from the rotational angle sensor 22. In the case where a resolver is employed as the rotational angle sensor 22, conceivably, the detection coils or excitation coil of the resolver may break or suffer insulation failure. In view of this, the sensor anomaly detection section 121 monitors the amplitude of an output signal from each detection coil, and determines that the sensor is anomalous when the amplitude deviates from a preset allowable range. Since the detection coils are provided in a pair such that their output signals have a phase shift of π/2 therebetween, an anomalous state can be detected through comparison of the two output signals. For example, the resolver can be determined to be anomalous in the case where the two output signals contradict each other (e.g., the case where one detection coil outputs a sinusoidal signal, and the other detection coil outputs a signal of a constant level). The sensor anomaly detection section 121 determines whether or not the rotational angle sensor 22 is anomalous in this manner, and outputs a sensor anomaly determination signal F which represents whether or not the rotational angle sensor 22 is anomalous. In the case where the sensor anomaly detection section 121 determines that the rotational angle sensor 22 is anomalous, the sensor anomaly detection section 121 sets the sensor anomaly determination signal F to "1." In the case where the sensor anomaly detection section 121 determines that the rotational angle sensor 22 is not anomalous, the sensor anomaly detection section 121 sets the sensor anomaly determination signal F to "0."

Figure 3:
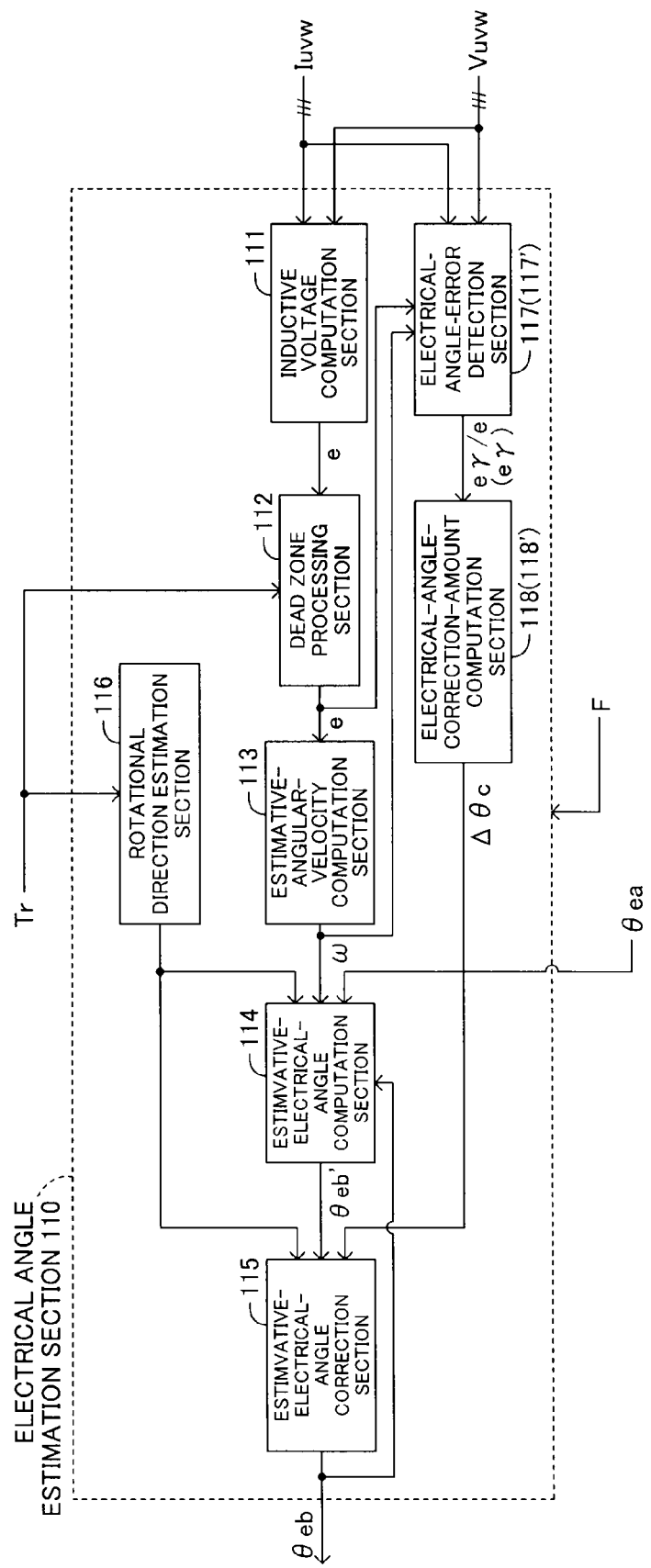
FIG. 3 is a functional block diagram showing the processing of an electrical angle estimation section.

In the case where the rotational angle sensor 22 becomes anomalous, since the detection of the electrical angle becomes impossible, it becomes impossible to drive the motor 20 by means of current vector control. In order to overcome such a drawback, the assist ECU 100 has an electrical angle estimation section 110 which estimates the electrical angle so as to continue the rotation control of the motor 20 even when the rotational angle sensor 22 becomes anomalous. The electrical angle estimation section 110 starts its operation upon receipt of the sensor anomaly determination signal (F=1). The electrical angle estimation section 110 has functional sections as shown in FIG. 3, which are implemented by the program control. That is, the electrical angle estimation section 110 includes an inductive voltage computation section 111, a dead zone processing section 112, an estimative-angular-velocity computation section 113, an estimative-electrical-angle computation section 114, an estimative-electrical-angle correction section 115, a rotational direction estimation section 116, an electrical-angle-error detection section 117, and an electrical-angle-correction-amount computation section 118.

The inductive voltage computation section 111 receives the detection signals which are output from the voltage sensor 39 and which represent the motor terminal voltages Vu, Vv, and Vw, respectively, and the detection signals which are output from the current sensor 38 and which represent the motor currents Iu, Iv, and Iw, respectively; and calculates inductive voltage e generated in the motor 20 as follows.

Figure 6:
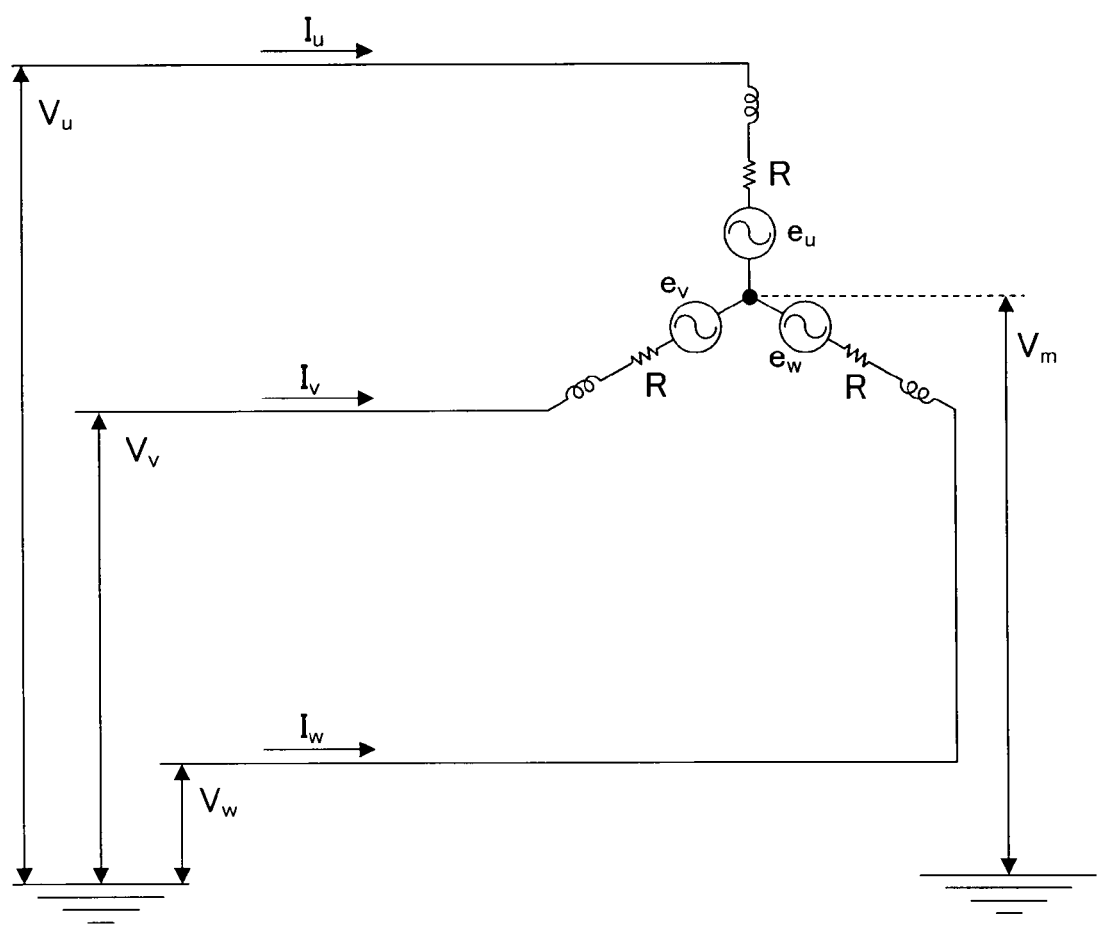
FIG. 6 is a circuit diagram of an electric motor used for calculation of inductive voltage.

As shown in FIG. 6, when the U-phase, V-phase, and W-phase inductive voltages of the motor 20 are represented by eu, ev, and ew, the inductive voltages eu, ev, and ew are obtained in accordance with the following Eqs. (2), (3), and (4), respectively.

$$eu = Vu - Iu \cdot R - Vm \quad (2)$$

$$ev = Vv - Iv \cdot R - Vm \quad (3)$$

$$ew = Vw - Iw \cdot R - Vm \quad (4)$$

In Eqs. (2) to (4), Vm represents the midpoint voltage, and R represents the winding resistance of the coil of each phase. The midpoint voltage Vm is calculated as Vm=(Vu+Vv+Vw)/3.

In this case, a voltage component (L·dI/dt) produced by the inductance L of the coil of each phase must be added for accurate calculation. However, since the influence of the inductance L is very small in the calculation of the inductive voltage, in the present embodiment, the voltage component (L·dI/dt) is assumed to be zero. Notably, the calculation may be performed in consideration of the voltage component (L·dI/dt) produced by the inductance L.

The inductive voltage e of the motor 20 is obtained from the three-phase inductive voltages eu, ev, and ew as follows. The three-phase inductive voltages eu, ev, and ew are converted to two-phase inductive voltages ed and eq in the d-q coordinate system in accordance with the following Eq. (5). Subsequently, the inductive voltage e is obtained from the two-phase inductive voltages ed and eq in accordance with the following Eq. (6).

$$\begin{bmatrix} e_d \\ e_q \end{bmatrix} = \sqrt{\frac{2}{3}} \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix} \begin{bmatrix} e_u \\ e_v \\ e_w \end{bmatrix} \quad (5)$$

$$e = \sqrt{e_d^2 + e_q^2} \quad (6)$$

The inductive voltage computation section 111 outputs the computed inductive voltage e to the dead zone processing section 112. Notably, the electrical angle θe in Eq. (5) is the electrical angle estimated at the preset point in time. That is, the newest value of the estimative electrical angle θeb, which is repeatedly calculated at predetermined short intervals will be used as described later.

Figure 7:
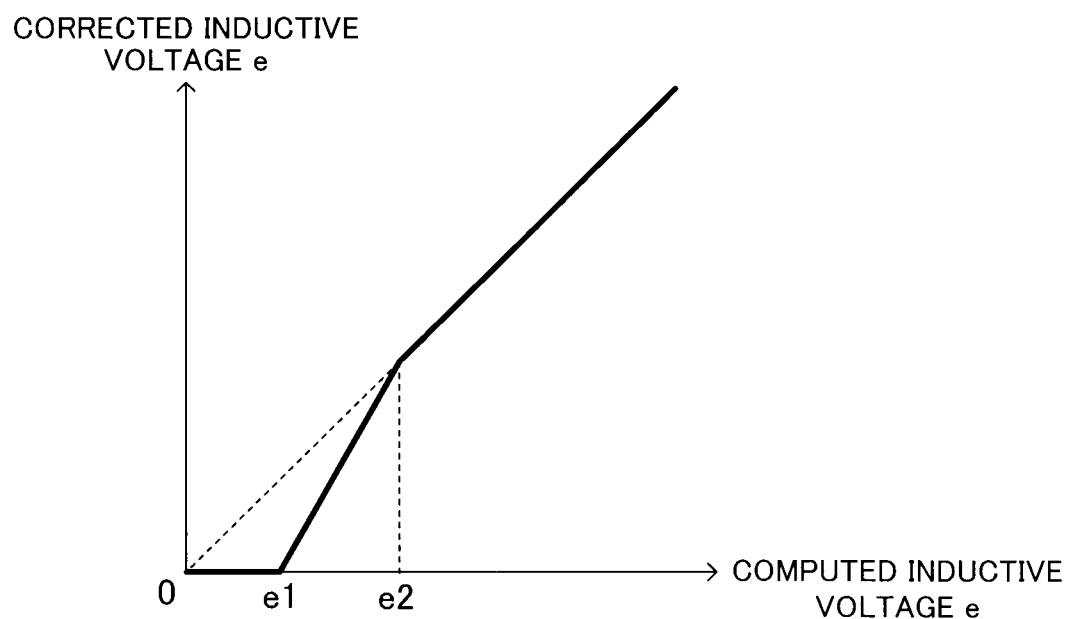
FIG. 7 is a graph showing a dead zone processing map.

The dead zone processing section 112 receives the steering torque Tr detected by the steering torque sensor 21 and the inductive voltage e computed by the inductive voltage computation section 111. The dead zone processing section 112 is configured to perform dead zone processing for the inductive voltage e when the magnitude |Tr| of the steering torque Tr is greater than a reference torque Tr0 set in advance, and not to perform the dead zone processing for the inductive voltage e when the magnitude |Tr| of the steering torque Tr is equal to or less than the reference torque Tr0. The dead zone processing section 112 stores a dead zone processing map as shown in FIG. 7. In the dead zone processing map, the horizontal axis represents the inductive voltage e computed by the inductive voltage computation section 111 (here, called the computed inductive voltage e), and the vertical axis represents the inductive voltage e having undergone the dead zone processing (here, called the corrected inductive voltage e). When the computed inductive voltage e falls within a range of 0 to e1, the dead zone processing section 112 sets the corrected inductive voltage e to 0 (zero). When the computed inductive voltage e falls within a range of e1 to e2, the dead zone processing section 112 sets the corrected inductive voltage e to a value (K·e) obtained by multiplying the computed inductive voltage e by a gain K. This gain K is set such that it increases from 0 to 1 as the computed inductive voltage e increases in the range of e1 to e2. When the computed inductive voltage e exceeds e2, the dead zone processing section 112 employs the computed inductive voltage e as the corrected inductive voltage e without changing it. The dead zone processing section 112 outputs the corrected inductive voltage e as the inductive voltage e generated in the motor 20. When the magnitude |Tr| of the steering torque Tr is equal to or less than the reference torque Tr0, the dead zone processing section 112 outputs the computed inductive voltage e as the inductive voltage e generated in the motor 20 without changing it.

Now, there will be described the reason why such dead zone processing is performed. Since the inductive voltage generated in the motor 20 is proportional to the angular velocity of the motor, the rotation angle of the motor per unit time can be estimated through detection of the inductive voltage. Therefore, the electrical angle can be advanced in synchronism with rotation of the rotor. However, the inductive voltage e computed by the inductive voltage computation section 111 involves measurement errors of the currents and voltages, errors of the winding resistances, etc. Thus, even when the motor 20 (the rotor thereof) does not rotate, the inductive voltage e does not become zero. Therefore, if the electrical angle is estimated by using the inductive voltage e computed by the inductive voltage computation section 111 as is, the electrical angle is advanced even when the driver keeps the current steering angle (this operation will be referred to as the steering keeping operation), whereby the torque of the motor 20 fluctuates. This torque fluctuation appears in the form of vibration of the steering wheel 11. In view of the above-described problem, a dead zone is provided for the inductive voltage e in order to restrain the output of the inductive voltage e caused by the errors. However, in the case where a dead zone is provided for the inductive voltage e, the driver senses a resistance in steering operation when he or she starts to turn the steering wheel 11.

When a steering torque is detected as a result of the steering wheel 11 being turned and electricity is supplied to the motor coils, the permanent magnet provided on the rotor is drawn by a magnetic field generated by the motor coils. At that time, since the estimative electrical angle does not advance until the inductive voltage e deviates from the dead zone, the magnetic field generated by the motor coils does not rotate. Accordingly, the rotor stays at a position where the permanent magnet is attached and caught by the magnetic field of the motor coils. That is, a state in which the current vector is oriented in the d-axis direction is maintained. Therefore, no steering assist torque can be generated, and the driver senses a resistance in the steering operation.

In order to overcome such a drawback, the dead zone processing section 112 is configured such that, when the magnitude of the steering torque Tr is small, the dead zone is not provided, whereby the estimative electrical angle is prevented from being fixed. Accordingly, the driver does not sense a resistance in the steering operation even when the driver starts to turn the steering wheel 11 from its neutral position (when the steering torque Tr is still small). When the driver does not operate the steering wheel 11, the steering torque Tr becomes zero, and electricity is not supplied to the motor 20. Therefore, vibration of the steering wheel 11 caused by torque fluctuation does not occur. Meanwhile, in the case where the magnitude of the steering torque Tr is large, if the dead zone is not provided, the electrical angle is advanced even in a state in which the motor 20 is not rotating. Thus, during the steering keeping operation, the torque of the motor 20 fluctuates, whereby the steering wheel 11 vibrates. In view of this phenomenon, when the magnitude of the steering torque Tr is large, the dead zone processing section 112 provides the dead zone so as to prevent the steering wheel 11 from vibrating during the steering keeping operation.

The inductive voltage e output from the dead zone processing section 112 is fed to the estimative-angular-velocity computation section 113. By making use of the proportional relation between the inductive voltage e of the motor 20 and the motor angular velocity, the estimative-angular-velocity computation section 113 estimates the motor angular velocity ω in accordance with the following Eq. (7).

$$\omega = e/Ke \tag{7}$$

Ke is a motor inductive voltage constant [V/(rad/s)] representing the relation between the angular velocity of the motor 20 and the inductive voltage. In the following description, the estimated motor angular velocity ω will be referred to as the estimative angular velocity ω.

The estimative-angular-velocity computation section 113 outputs the estimative angular velocity ω to the estimative-electrical-angle computation section 114. In the assist ECU 100, the microcomputer performs various types of computations at predetermined short computation intervals. Accordingly, an electrical angle by which the rotor of the motor 20 has rotated in a single computation period can be obtained from the estimative angular velocity ω and the computation period. In view of this, the estimative-electrical-angle computation section 114 computes, as an electrical angle addition amount Δθa, the electrical angle by which the rotor of the motor 20 has rotated in a single computation period, and calculates the current estimative electrical angle by adding the electrical angle addition amount Δθa to the estimative electrical angle calculated at the previous computation timing which precedes the present computation timing by a time corresponding to the single period.

In this case, since the direction in which the electrical angle is added; that is, the rotational direction of the motor 20, must be determined, the estimative-electrical-angle computation section 114 acquires information representing the rotational direction of the motor 20 from the rotational direction estimation section 116. The rotational direction estimation section 116 outputs information representing the direction (sign) of the steering torque Tr detected by the steering torque sensor 21, by regarding the direction of the steering torque Tr as the rotational direction of the motor 20.

The electrical angle addition amount Δθa is calculated in accordance with the following Eq. (8).

$$\Delta\theta a = Kf \cdot \text{sign}(Tr) \cdot \omega \tag{8}$$

Kf is a constant for obtaining, from the motor angular velocity (rad/s), an electrical angle (rad) by which the rotor of the motor 20 rotates in a single computation period, and corresponds to the computation period (s). Also, sign (Tr) represents the sign of the steering torque Tr (the direction of torque acting on the steering shaft 12). When the steering torque Tr assumes a positive value or is zero, sign (Tr)=1, and, when the steering torque Tr assumes a negative value, sign (Tr)=−1.

Since the estimative-electrical-angle computation section 114 must acquire the estimative electrical angle calculated at the previous computation timing which precedes the present computation timing by a time corresponding to the single period, the estimative-electrical-angle computation section 114 receives and stores the newest value of the estimative electrical angle θeb output from the estimative-electrical-angle correction section 115 to be described later; i.e., the estimative electrical angle θeb(n−1) calculated at the previous computation timing which precedes the present computation timing by a time corresponding to the single period. As shown in the following Eq. (9), the estimative-electrical-angle computation section 114 calculates the current estimative electrical angle θeb' by adding the electrical angle addition amount Δθa to this estimative electrical angle θeb(n−1).

$$\theta eb' = \theta eb(n-1) + \Delta\theta a \tag{9}$$

In this case, the initial value of the estimative electrical angle θeb(n−1) is a value of actual electrical angle immediately before an anomaly of the rotational angle sensor 22 is detected by the sensor anomaly detection section 121. Before an anomaly of the rotational angle sensor 22 is detected, the estimative-electrical-angle computation section 114 acquires the actual electrical angle θea output from the actual electrical angle conversion section 120, and always stores the latest actual electrical angle θea for update. Upon detection of the fact that the sensor anomaly determination signal F output from the sensor anomaly detection section 121 has been changed to "1," which represents an anomaly of the rotational angle sensor 22, the estimative-electrical-angle computation section 114 stores the actual electrical angle θea immediately before the anomaly detection as the estimative electrical angle θeb(n−1), and starts the above-described computation of the estimative electrical angle θeb'. After that, in order that the estimative electrical angle θeb calculated by the estimative-electrical-angle correction section 115 can be used as the estimative electrical angle θeb(n−1) of Eq. (9) in the next computation period, the estimative-electrical-angle computation section 114 regularly stores the estimative electrical angle θeb as the estimative electrical angle θeb(n−1) for update.

The estimative-electrical-angle computation section 114 outputs the calculated estimative electrical angle θeb' to the estimative-electrical-angle correction section 115. In addition to the estimative electrical angle θeb', the estimative-electrical-angle correction section 115 receives the rotational direction information output from the rotational direction estimation section 116 and an electrical angle correction amount Δθc output from the electrical-angle-correction-amount computation section 118. In order to enhance the robustness of the motor 20 against loss of synchronism, which will be described later, the estimative-electrical-angle correction section 115 corrects the estimative electrical angle θeb' by adding the electrical angle correction amount Δθc to the estimative electrical angle θeb' in the rotational direction. That is, the estimative-electrical-angle correction section 115 calculates the estimative electrical angle θeb in accordance with the following Eq. (10). This estimative electrical angle θeb becomes the final estimative electrical angle.

$$\theta eb = \theta eb' + \text{sign}(Tr) \cdot \Delta\theta c \tag{10}$$

The estimative-electrical-angle correction section 115 outputs the calculated estimative electrical angle θeb to the electrical angle selection section 122. The electrical angle selection section 122 acquires the actual electrical angle θea and the estimative electrical angle θeb, and reads the sensor anomaly determination signal F from the sensor anomaly detection section 121. When the sensor anomaly determination signal F is "1" representing that the rotational angle sensor 22 is anomalous, the electrical angle selection section 122 selects the estimative electrical angle θeb. When the sensor anomaly determination signal F is "0" representing that the rotational angle sensor 22 is normal, the electrical angle selection section 122 selects the actual electrical angle θea. The electrical angle selection section 122 outputs the selected actual electrical angle θea or estimative electrical angle θeb as the electrical angle θe.

The electrical angle θe is sent to the three-phase/two-phase coordinate conversion section 103 and the two-phase/three-phase coordinate conversion section 105, and is used for the above-described coordinate conversion computation. Accordingly, when an anomaly of the rotational angle sensor 22 is detected, the assist ECU 100 performs the current vector control while using the d-q coordinate system defined by the estimative electrical angle; that is, the γ-δ coordinate system.

Next, a configuration for calculating the electrical angle correction amount Δθc will be described. As described above, the assist current instruction section 101 sets a current instruction value such that the current vector coincides with the q-axis direction, to thereby maximize the motor torque efficiency.

Figure 16:
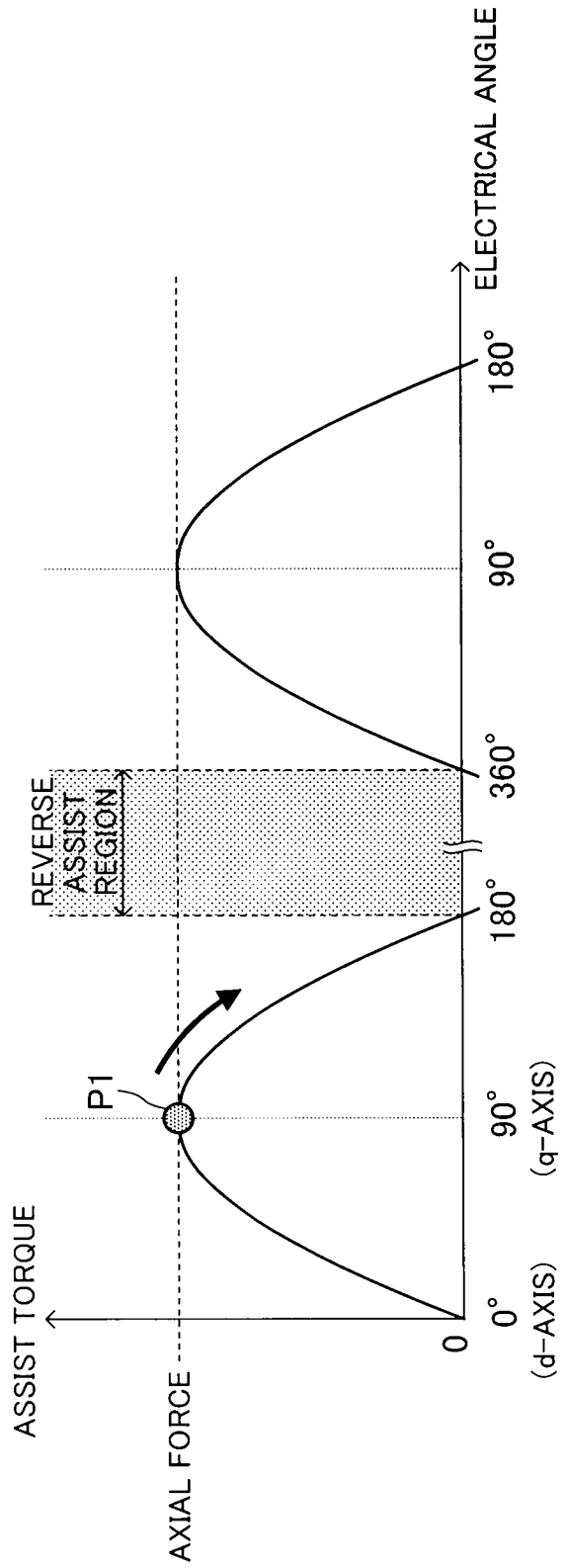
FIG. 16 is a graph showing an assist torque characteristic; i.e., a change in assist torque with the direction of the current vector.
Figure 17:
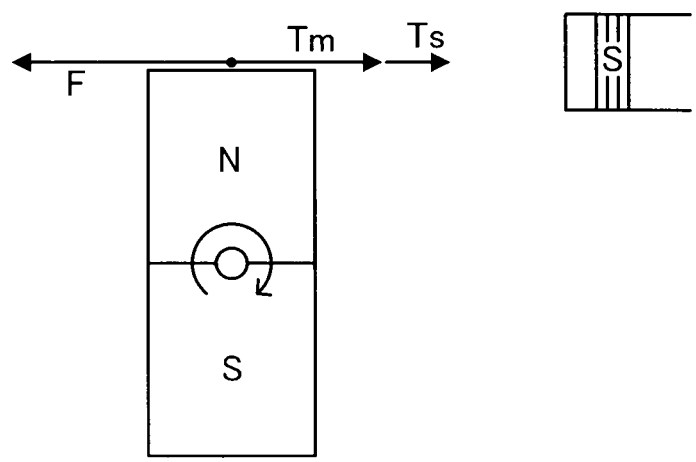
FIG. 17 is an explanatory diagram showing the relation of forces when the current vector is controlled to coincide with the q-axis direction.

In the case where the axial force increases sharply and the assist torque generated by the motor 20 becomes insufficient, the rotor is rotated in the direction opposite the steering direction. In the case where the rotational angle sensor 22 operates normally, the electrical angle can be detected accurately. Therefore, the direction of the current vector can be changed with rotation of the rotor so as to follow the q-axis direction. Accordingly, as shown at the position P1 of FIG. 16, there can be maintained a state in which the maximum assist torque can be generated. However, in the case where the rotational angle sensor 22 fails and sensorless control is performed through use of the estimative electrical angle, the direction in which the steering torque acts and the rotational direction of the rotor become opposite each other, and the estimative angular velocity ω increases relatively. Therefore, as indicated by the arrow in FIG. 16, the estimative electrical angle advances in relation to the rotor, whereby the motor 20 loses synchronism. As a result, the assist torque that the motor 20 can generate decreases, and the direction of the current vector enters a reverse assist region which is advanced 180° or more from the d-axis direction. In the assist torque characteristic in this reverse assist region is identical with the assist torque characteristic in the range of 0° to 180° except that the direction of the current vector is opposite that in the assist torque characteristic in the range of 0° to 180° (the waveform inverts).

In the case where sensorless control is performed, the actual d-q coordinate system and the γ-δ coordinate system (estimated as the d-q coordinate system) deviate from each other by an amount corresponding to the error of the estimative electrical angle. Therefore, when the current vector control is performed while the γ-δ coordinate system is used as a reference, the direction of the current vector deviates from the q-axis direction. In this case, if the current vector is oriented in a direction lagging behind the q-axis, loss of synchronism of the motor 20 can be prevented. Specifically, even in the case the rotor is rotated in the direction opposite the steering direction due to an increase in the axial force and the electrical angle advances relatively, since the assist torque generated by the motor 20 increases, the reverse rotation of the rotor is restrained, whereby the motor 20 is prevented from losing synchronism. However, in the case where the current vector is oriented in the q-axis direction or in a direction leading the q-axis, the motor 20 loses synchronism. Specifically, when the rotor is rotated in the reverse direction and the electrical angle advances relatively, the assist torque that the motor 20 can generate decreases. Therefore, the reverse rotation of the rotor cannot be restrained, and the motor 20 loses synchronism.

In order to solve such a problem, in the present embodiment, there is calculated the electrical angle correction amount Δθc for correcting the estimative electrical angle such that the δ-axis is oriented in a direction lagging behind the q-axis in terms of electrical angle, and the calculated electrical angle correction amount Δθc is supplied to the estimative-electrical-angle correction section 115. Thus, loss of synchronism of the motor 20 is restrained. The electrical angle correction amount Δθc is calculated by the electrical-angle-error detection section 117 and the electrical-angle-correction-amount computation section 118.

For calculation of the electrical angle correction amount Δθc, the difference in electrical angle between the q-axis and the δ-axis must be obtained. The difference between the q-axis and the δ-axis can be detected on the basis of the γ-axis inductive voltage generated in the γ-axis direction (the γ-axis direction component of the inductive voltage e generated in the q-axis direction). The γ-axis inductive voltage eγ can be represented by the following Eq. (11).

$$e\gamma = V\gamma - R \cdot I\gamma + \omega \cdot L \cdot I\delta \tag{11}$$

In Eq. (11), Vγ represents the γ-axis direction component of armature voltage; R represents the wiring resistance of the coil; Iγ represents the γ-axis direction component of armature current; L is the inductance of the coil; and Iδ represents the δ-axis direction component of the armature current.

Figure 8:
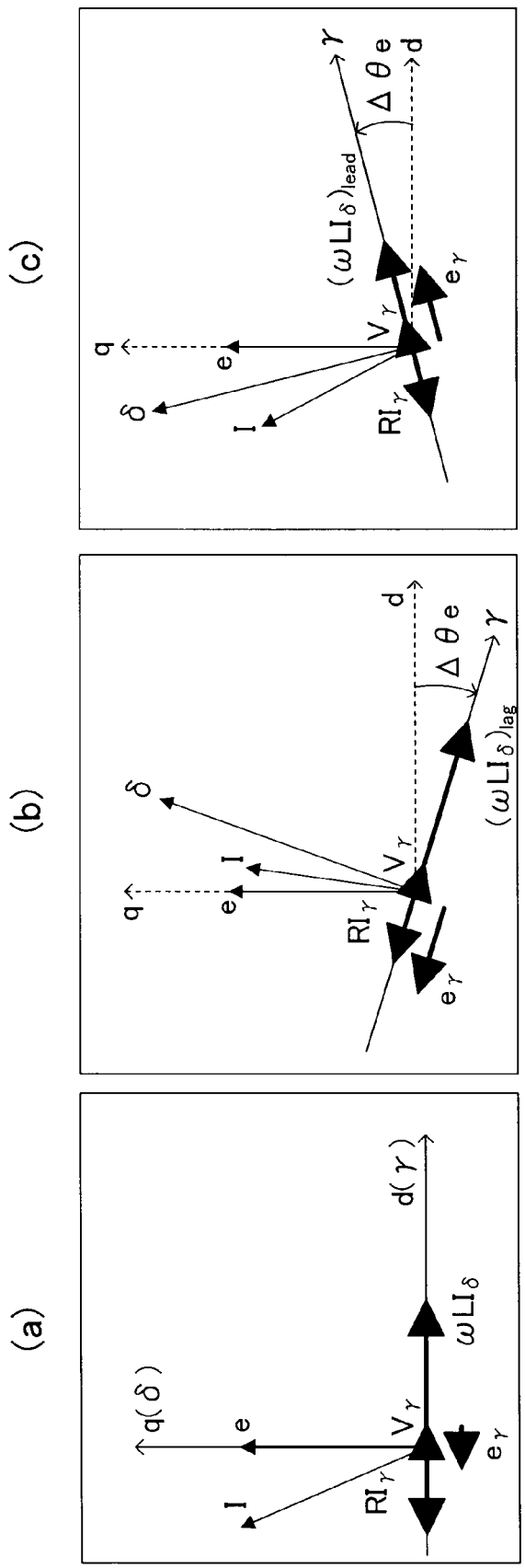
FIG. 8 is a sets of graphs used for describing a mechanism of calculating an electrical angle correction amount.

The inductive voltage e is always generated on the q-axis. Accordingly, when the q-axis and the δ-axis coincide with each other as shown in FIG. 8(*a*), the γ-axis inductive voltage eγ becomes zero (eγ=0). When the δ-axis lags behind the q-axis as shown in FIG. 8(*b*), the γ-axis inductive voltage eγ assumes a negative value (eγ<0). When the δ-axis leads the q-axis as shown in FIG. 8(*c*), the γ-axis inductive voltage eγ assumes a positive value (eγ>0).

Also, the electrical angle difference (error) between the q-axis and the δ-axis can be detected. When the electrical angle error between the q-axis and the δ-axis is represented by Δθe, the relation between the inductive voltage (actual inductive voltage) e generated in the q-axis direction and the γ-axis inductive voltage eγ can be represented by the following Eq. (12).

$$e\gamma = e \cdot \sin \Delta\theta e \tag{12}$$

Accordingly, the electrical angle error Δθe can be obtained in accordance the following relational Eq. (13).

$$\sin \Delta\theta e = e\gamma/e = (V\gamma - R \cdot I\gamma + \omega \cdot L \cdot I\delta)/e \tag{13}$$

The Vγ, Iγ, and Iδ of the right side of Eq. (13) can be calculated from the motor terminal voltages Vu, Vv, Vw and the motor currents Iu, Iv, Iw by use of the conversion matrix C of Eq. (1) for conversion from the three-phase coordinate system to the d-q coordinate system. ω may be the estimative angular velocity ω calculated by the estimative-angular-velocity computation section 113, and e may be the inductive voltage e output from the dead zone processing section 112. Notably, ω and e may be the estimative angular velocity and the inductive voltage not having undergone the dead zone processing.

Figure 9:
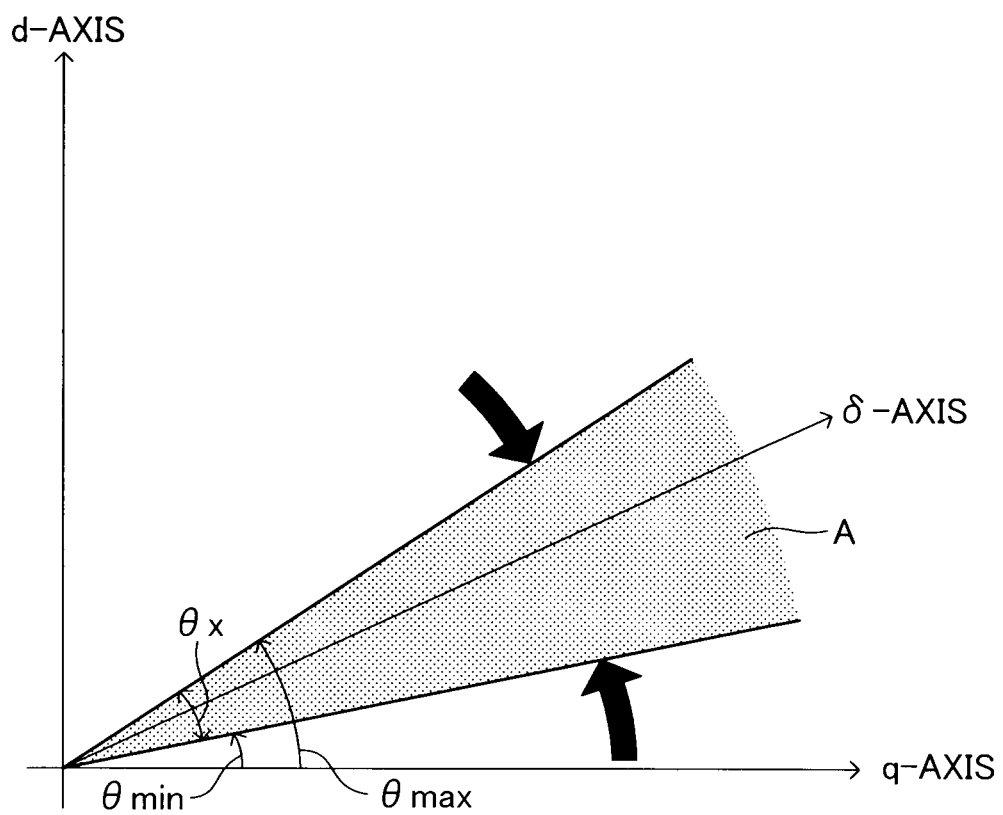
FIG. 9 is a graph showing a prescribed angular range of the δ-axis in the d-q coordinate system.

Once the electrical angle error Δθe between the q-axis and the δ-axis is detected, the position of the δ-axis can be made approximately coincide with the position of the q-axis by correcting the estimative electrical angle by an amount corresponding to the electrical angle error Δθe. However, as described above, if the estimative electrical angle is corrected such that the δ-axis and the q-axis coincide with each other, the motor 20 becomes likely to lose synchronism due to fluctuation of the axial force, although the motor torque efficiency becomes the maximum. In view of this, in the present embodiment, the estimative electrical angle θeb' is corrected such that the electrical angle of the δ-axis lags behind the electrical angle of the q-axis; that is, the δ-axis is oriented in a direction lagging behind the q-axis in terms of electrical angle. In this case, in order to secure satisfactory robustness of the motor 20 against loss of synchronism and satisfactory motor torque efficiency in a well balanced manner, the estimative electrical angle θeb' is corrected such that, as shown in FIG. 9, the δ-axis is located within a prescribed angular range A set in the d-q coordinate system. A boundary angle in the prescribed angular range A at which the electrical angle delay of the δ-axis from the q-axis becomes minimum will be referred to as the minimum delay electrical angle θmin. A boundary angle in the prescribed angular range A at which the electrical angle delay of the δ-axis from the q-axis becomes maximum will be referred to as the maximum delay electrical angle θmax.

The minimum delay electrical angle θmin is set, in accordance with the following equation, on the basis of an angle θ1 set from a margin for load increase, an angle θ2 determined in consideration of various errors, and an angle θ3 representing a range in which correction can be performed by means of estimative electrical angle correction feedback.

θmin=θ1+θ2−θ3

Notably, the angles θ1, θ2, and θ3 are such that an angle from the q-axis in the counterclockwise direction in FIG. 9 (the direction in which the electrical angle of the δ-axis lags) is a positive angle [deg].

Figure 10:
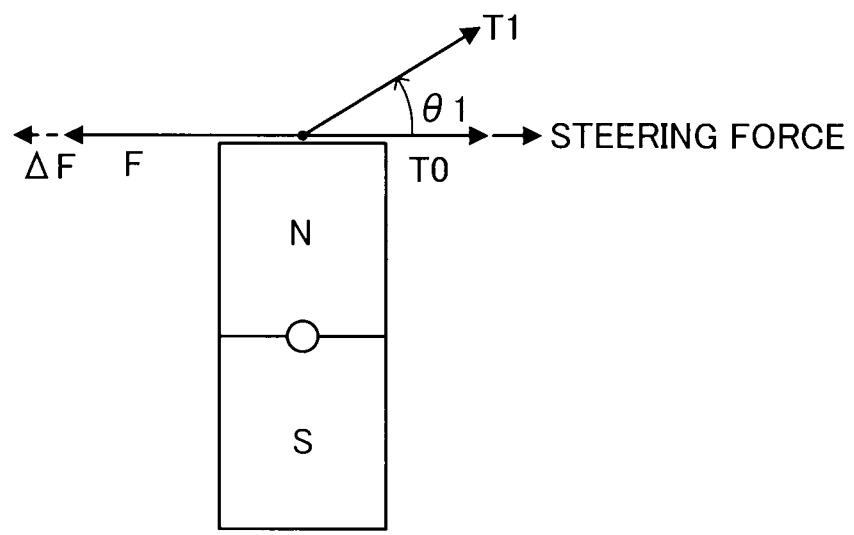
FIG. 10 is an explanatory diagram showing an angle θ1.

The greater the current instruction value Iq*, the greater the influence of vibration caused by the synchronism loss of the motor 20. In view of this, the angle θ1, which is a margin angle, is set such that the motor 20 does not lose synchronism for a load increase at the time when the current instruction value Iq* reaches a predetermined value I0, at which the influence of vibration becomes large. Here, as shown in FIG. 10, a motor torque at the time when the current instruction value Iq* reaches I0 is represented by T0; an axial force balancing with the motor torque T0 is represented by F; an expected load increase is represented by ΔF; and a motor torque in the direction of the angle θ1 required to generate the motor torque T0 is represented by T1. The motor torque T0, the axial force F, the expected load increase ΔF, the motor torque T1 have the following relations.

F=T0

F+ΔF=T1

T1·cos θ1=T0

From these relations, the angle θ1 can be represented by the following equation.

θ1=cos$^{-1}${(T0/(T0+ΔF)}

Figure 11:
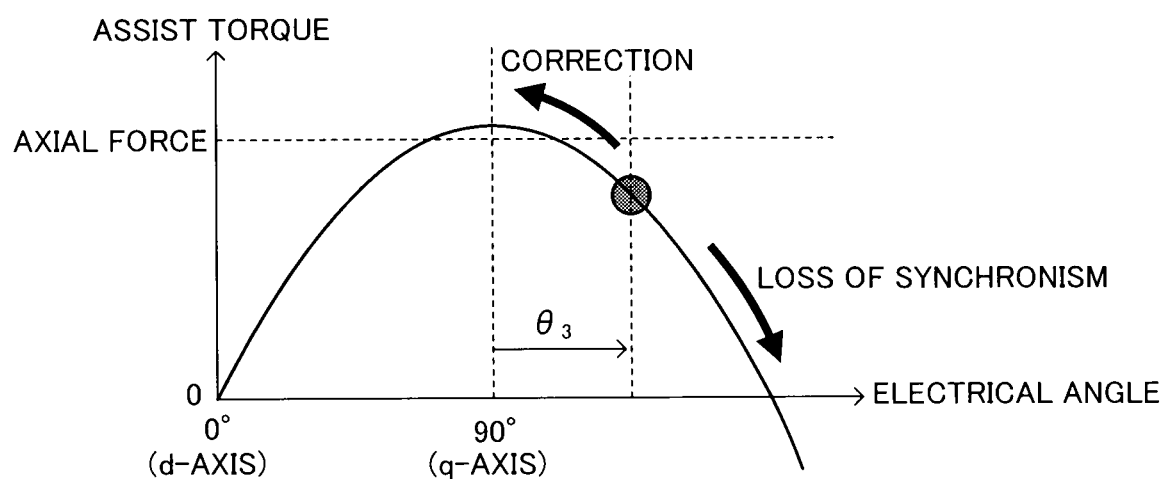
FIG. 11 is an explanatory diagram showing an angle θ3.

The angle θ2 is set in considerations of various computation errors and a current measurement error. As shown in FIG. 11, the angle θ3 represents a limit angle of a correctable range determined such that, even in the case where the direction of the current vector leads the q-axis, if the direction of the current vector is within the correctable range, the direction of the current vector can be returned to the q-axis side by the correction feedback of the estimative electrical angle, which will be described later, whereby loss of synchronism can be prevented. The angle θ3 is determined in advance through an experiment, and is set.

Meanwhile, the maximum delay electrical angle θmax is set in consideration of thermal performance and assist performance. The greater the degree of closeness of the direction of the current vector to the d-axis, the greater the amount of heat generated by the motor coil and the motor drive circuit 30. Accordingly, a delay angle of the current vector from the q-axis, which is the limit of a range within which the thermal performance required for performance of the sensorless control is attained, is set as the angle θ4. Also, as the direction of the current vector comes closer to the d-axis, the assist torque decreases. Accordingly, a delay angle of the current vector from the q-axis, which is the limit of a range within which the assist performance required for performance of the sensorless control is attained, is set as the angle θ5. The assist performance required for performance of the sensorless control refers to the necessary lowest assist performance, and is set to such a performance as to output an assist torque which enables a driver to perform steering operation to the maximum steering angle while driving the vehicle. The maximum delay electrical angle θmax is set to smaller one of the angle θ4 and the angle θ5 in terms of the delay angle from the q-axis such that both the thermal performance and the assist performance become satisfactory.

In this manner, the estimative electrical angle θeb' is corrected such that the δ-axis is located within the prescribed angular range A set between the minimum delay electrical angle θmin and the maximum delay electrical angle θmax. Thus, during the sensorless control, the direction of the current vector is controlled to be located in the prescribed angular range A. In the present embodiment, the angular range from the q-axis to the minimum delay electrical angle θmin is set narrower than the prescribed angular range A (the angle θx from the minimum delay electrical angle θmin to the maximum delay electrical angle θmax).

Referring back to FIG. 3, the electrical angle estimation section 110 includes the electrical-angle-error detection section 117 and the electrical-angle-correction-amount computation section 118. The electrical-angle-error detection section 117 receives the detection signals output from the voltage sensor 39 and representing the motor terminal voltages Vu, Vv, Vw, the detection signals output from the current sensor 38 and representing the motor currents Iu, Iv, Iw, the inductive voltage e output from the dead zone processing section 112, and the estimative angular velocity ω output from the estimative-angular-velocity computation section 113. The electrical-angle-error detection section 117 calculates the value of the above-described eγ/e (the ratio of the γ-axis inductive voltage eγ to the inductive voltage e generated in the q-axis direction). As described above, the relation sin Δθe=eγ/e stands. Accordingly, the value of eγ/e corresponds to the electrical angle error Δθe between the q-axis and the δ-axis.

Figure 12:
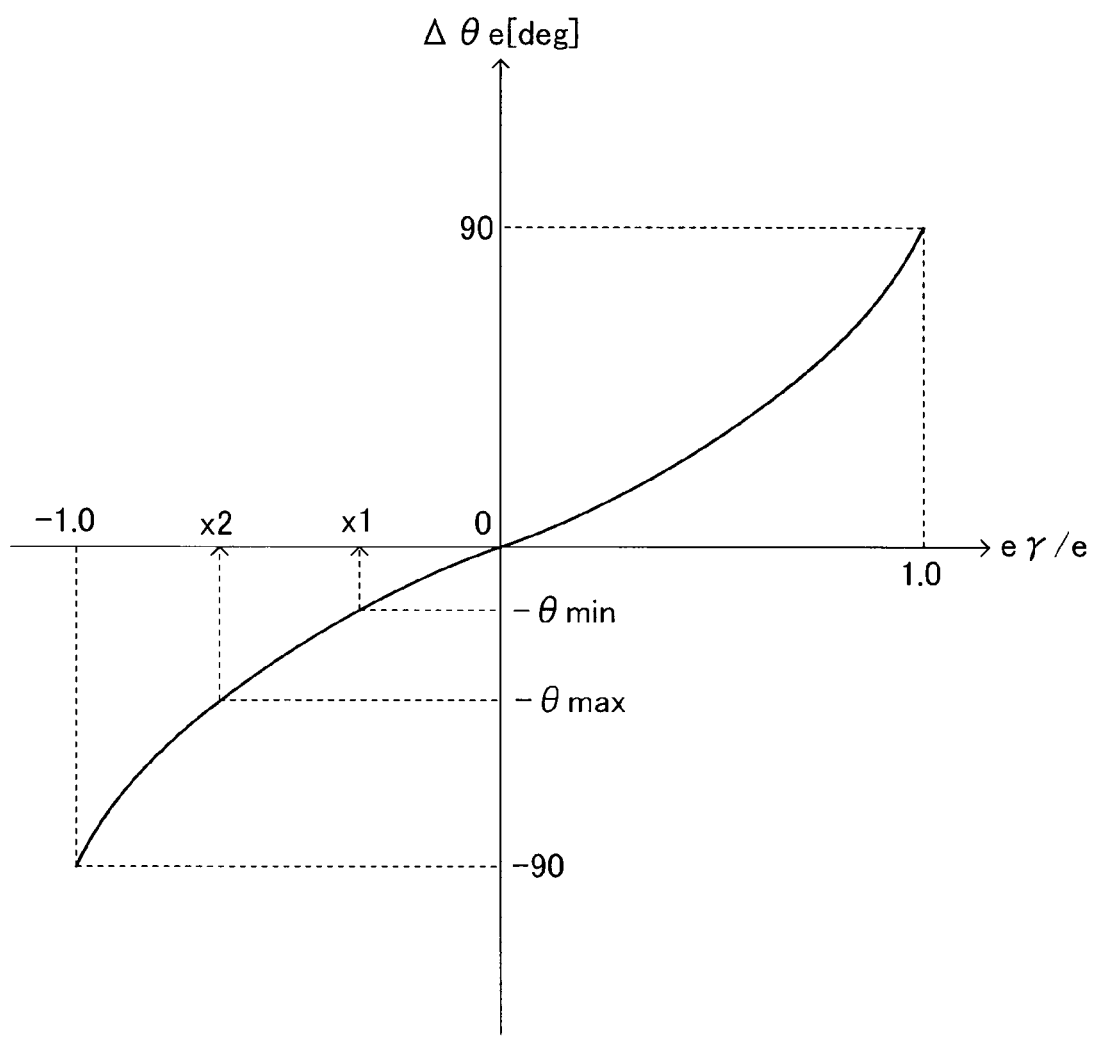
FIG. 12 is a graph showing the relation between detection value eγ/e and electrical angle error Δθe.

In view of this, the electrical-angle-error detection section 117 outputs the value of eγ/e to the electrical-angle-correction-amount computation section 118 as a detection value, without calculating the electrical angle error $\Delta\theta e$. FIG. 12 shows the relation between the detection value e/eγ and the electrical angle error $\Delta\theta e$.

Figure 13:
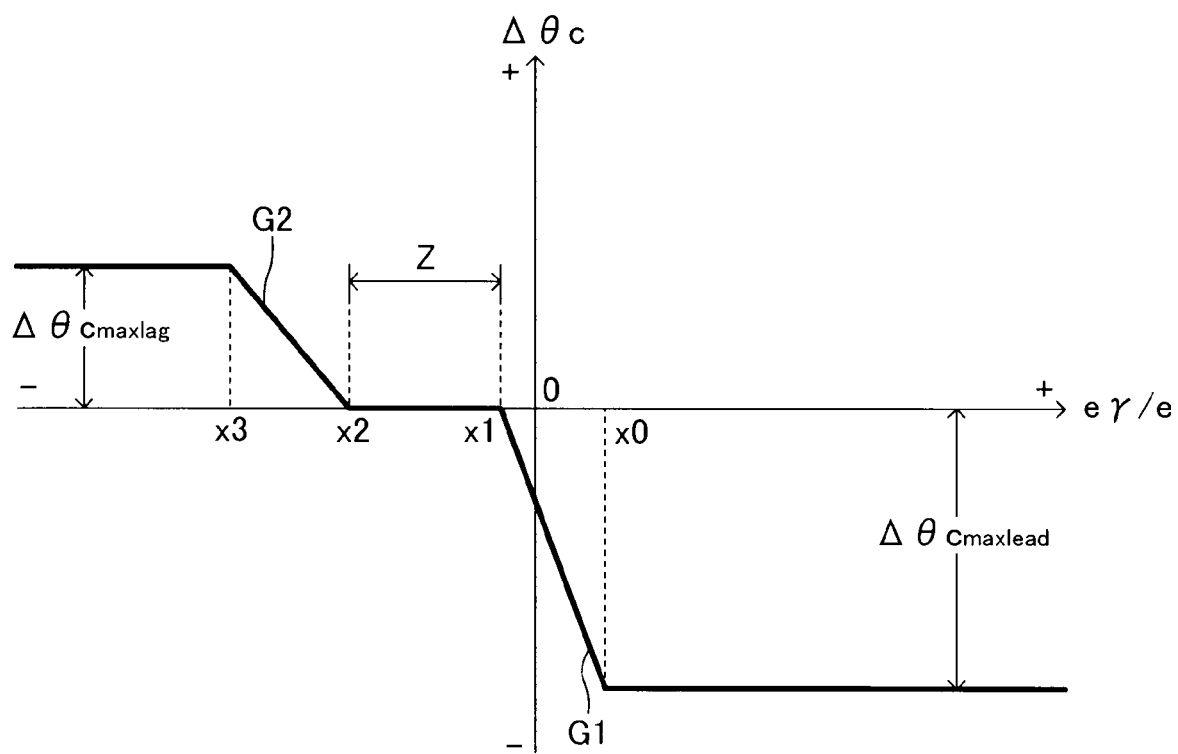
FIG. 13 is a graph showing an electrical-angle-correction-amount calculation map.

The electrical-angle-correction-amount computation section 118 receives the detection value eγ/e output from the electrical-angle-error detection section 117, and calculates the electrical angle correction amount $\Delta\theta c$ in a single computation period with reference to an electrical-angle-correction-amount calculation map. As shown in FIG. 13, the electrical-angle-correction-amount calculation map defines the relation between the detection value eγ/e and the electrical angle correction amount $\Delta\theta c$.

The electrical angle correction amount $\Delta\theta c$ is a value used for correcting the estimative electrical angle θeb' such that the δ-axis is located within the prescribed angular range A set in the d-q coordinate system, to thereby realize a satisfactory robustness against loss of synchronism and a satisfactory motor torque efficiency. Accordingly, in the electrical-angle-correction-amount calculation map, a dead zone Z is set in a range of the detection value eγ/e corresponding to the minimum delay electrical angle θmin and the maximum delay electrical angle θmax, which are boundaries of the prescribed angular range A. Here, a detection value eγ/e corresponding to the minimum delay electrical angle θmin is represented by x1, and a detection value eγ/e corresponding to the maximum delay electrical angle θmax is represented by x2. In this case, the dead zone Z of the detection value eγ/e set to extend from x1 to x2. The values of x1 and x2 are obtained from the relation between the electrical angle error $\Delta\theta e$ and the detection value eγ/e (see Eq. (13) and FIG. 12), and are set.

In the case where the detection value eγ/e becomes a positive value, the δ-axis leads the q-axis in terms of electrical angle. Accordingly, in this case, the electrical angle correction amount $\Delta\theta c$ is set to a negative value. In the case where the detection value eγ/e becomes a negative value, the δ-axis lags behind the q-axis in terms of electrical angle. In this case, when the detection value eγ/e is greater than x1, the electrical angle correction amount $\Delta\theta c$ is set to a negative value in order to enhance the robustness of the motor 20 against loss of synchronism. When the detection value eγ/e is not greater than x1 and not smaller than x2, the electrical angle correction amount $\Delta\theta c$ is set to 0 (zero), because the δ-axis is located within the prescribed angular range A. When the detection value eγ/e is smaller than x2, the electrical angle correction amount $\Delta\theta c$ is set to a positive value.

Also, in the electrical-angle-correction-amount calculation map, the electrical angle correction amount $\Delta\theta c$ is limited to a predetermined upper limit when the detection value eγ/e becomes equal to or greater than x0, which is greater than x1, and when the detection value eγ/e becomes equal to or smaller than x3, which is smaller than x2. In the present embodiment, as shown in FIG. 13, the upper limit of the electrical angle correction amount $\Delta\theta c$ for the case where the electrical angle of the δ-axis lags behind the prescribed angular range A is represented by $\Delta\theta cmaxlag$, and the upper limit of the electrical angle correction amount $\Delta\theta c$ for the case where the electrical angle of the δ-axis leads the prescribed angular range A is represented by $\Delta\theta cmaxlead$. The upper limit $\Delta\theta cmaxlead$ is set to a larger value, as compared with the upper limit $\Delta\theta cmaxlag$ (comparison between their absolute values).

When the detection value eγ/e falls in the range of x0 to x1 or the range of x2 to x3, the electrical angle correction amount $\Delta\theta c$ is set to an amount proportional to the amount of deviation of the detection value eγ/e from the dead zone Z. In this case, the electrical angle correction sensitivity is set to change depending on whether the electrical angle of the δ-axis leads or lags behind the prescribed angular range A. The electrical angle correction sensitivity refers to the ratio of the electrical angle correction amount $\Delta\theta c$ to the amount of deviation of the detection value eγ/e from the dead zone Z. In the present embodiment, the correction sensitivity (the inclination of a characteristic line G1 of FIG. 13) for the case where the electrical angle of the δ-axis leads the prescribed angular range A is set to be greater than the correction sensitivity (the inclination of a characteristic line G2 of FIG. 13) for the case where the electrical angle of the δ-axis lags behind the prescribed angular range A.

Upon completion of the calculation of the electrical angle correction amount $\Delta\theta c$ performed with reference to the electrical-angle-correction-amount calculation map, the electrical-angle-correction-amount computation section 118 outputs the calculation result to the estimative-electrical-angle correction section 115. As described above, the estimative-electrical-angle correction section 115 corrects the estimative electrical angle θeb' by adding the electrical angle correction amount $\Delta\theta c$, in the rotational direction, to the estimative electrical angle θeb' output from the estimative-electrical-angle computation section 114. Subsequently, the estimative-electrical-angle correction section 115 outputs to the electrical angle selection section 122 the estimative electrical angle θeb obtained through correction.

Figure 14:
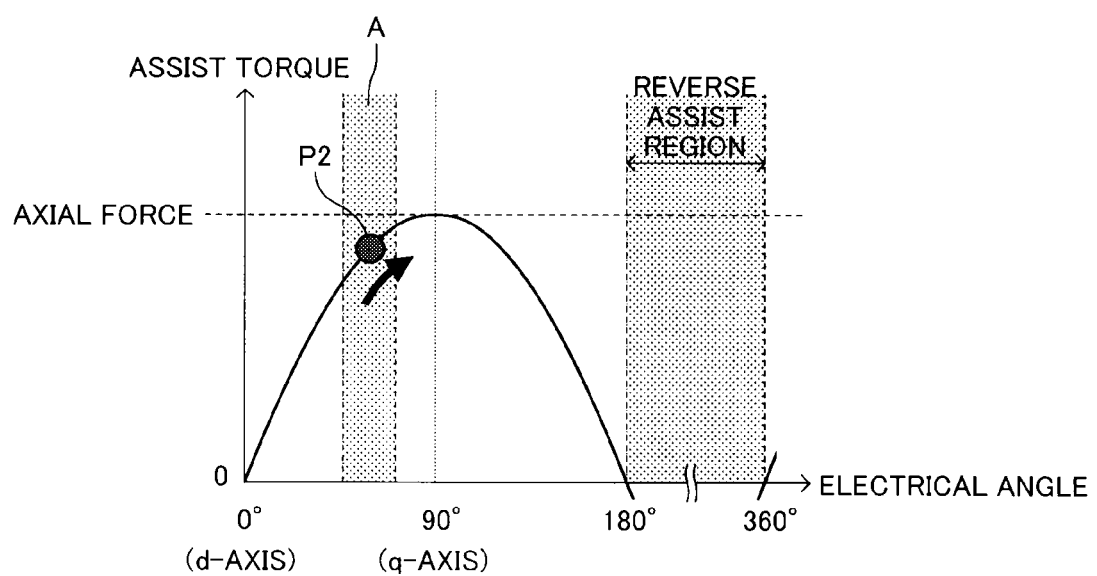
FIG. 14 is a graph showing an assist torque characteristic; i.e., a change in assist torque with the direction of the current vector.

The assist ECU 100 repeats the above-described processing at short computation intervals. Accordingly, when an anomaly of the rotational angle sensor 22 is not detected (the sensor anomaly determination signal F=0), current vector control is performed through use of the d-q coordinate system set on the basis of the actual electrical angle θea. Meanwhile, when an anomaly of the rotational angle sensor 22 is detected (the sensor anomaly determination signal F=1), the electrical angle estimation section 110 calculates the estimative electrical angle θeb. The current vector control is performed through use of the γ-δ coordinate system, which is estimated as the d-q coordinate system from the estimative electrical angle θeb. When sensorless control is performed, the electrical angle correction amount $\Delta\theta c$ is computed in accordance with the electrical-angle-correction-amount calculation map, and the estimative electrical angle θeb' is corrected. Therefore, feedback control is performed such that the δ-axis is located within the prescribed angular range A as indicted by the arrow in FIG. 9. As a result of such control, the current vector is oriented in a direction which lags behind the actual q-axis. Accordingly, although the motor torque efficiency does not become the maximum as indicated at a position P2 of FIG. 14, the synchronism loss of the motor 20 can be restrained. Specifically, when the rotor rotates in the reverse direction as a result of a sharp increase in the axial force and the direction of the current vector advances, the assist torque increases, whereby the synchronism loss of the motor 20 can be restrained.

The above-described electric power steering apparatus of the present embodiment provides the following actions and effects.

1. When an anomaly of the rotational angle sensor 22 is detected, the estimative electrical angle is corrected such that the electrical angle of the δ-axis lags behind the electrical angle of the q-axis. Accordingly, in the case where the axial force increases sharply and the rotor of the motor 20 rotates in the direction opposite the steering direction, the assist torque generated by the motor 20 increases, whereby the reverse rotation of the rotor can be restrained. As a result, the robustness of the motor 20 against loss of synchronism can be enhanced.

2. Since the information regarding the motor rotational direction required for calculation of the estimative electrical angle is acquired from the direction of the steering torque Tr detected by the steering torque sensor 21, a dedicated sensor for detecting the motor rotational direction is not required. Thus, the electric power steering apparatus can be implemented at low cost. In the case where the information regarding the rotational direction is acquired from the steering torque Tr, when the rotor of the motor 20 rotates in the direction opposite the steering direction, the rotational direction of the rotor and the direction in which the estimative electrical angle is advanced become opposite each other, whereby the relative estimative angular velocity ω increases. Therefore, the motor 20 becomes likely to lose synchronism. However, in the present embodiment, since the estimative electrical angle is corrected such that the electrical angle of the δ-axis lags behind the electrical angle of the q-axis, the reverse rotation of the rotor can be restrained. As a result, satisfactory robustness of the motor 20 against loss of synchronism and cost reduction can be realized simultaneously.

3. The electrical angle correction amount Δθc is set such that the electrical angle of the δ-axis falls within the prescribed angular range A lagging behind the q-axis in terms of electrical angle. Since this angular range A is set in consideration of a margin for load increase, various errors, an angle representing a range within which correction can be performed by the estimative electrical angle correction feedback, thermal performance, and assist performance, a satisfactory robustness of the motor 20 against loss of synchronism and a satisfactory motor torque efficiency can be secured in a well balanced manner. Also, the necessary lowest assist performance can be secured.

4. For calculation of the electrical angle correction amount Δθc, the difference in electrical angle between the δ-axis and the q-axis must be detected. In the present embodiment, since the detection value eγ/e is calculated, the angle difference between the δ-axis and the q-axis (electrical angle error) can be detected. As a result, the δ-axis can be properly maintained in the prescribed angular range A. Also, since the electrical angle correction amount Δθc is calculated from the detection value eγ/e with reference to the electrical-angle-correction-amount calculation map, the prescribed angular range A can be readily set through provision of the dead zone Z for the detection value eγ/e.

5. For calculation of the electrical angle correction amount Δθc, an upper limit is set so as to limit the amount by which the estimative electrical angle can be corrected at a time. In this case, the upper limit Δθcmaxlead for the case where the electrical angle of the δ-axis leads the prescribed angular range A is set to be greater than the upper limit Δθcmaxlag for the case where the electrical angle of the δ-axis lags behind the prescribed angular range A. Therefore, in the case where the electrical angle of the δ-axis enters a region where the motor 20 is likely to lose synchronism, the electrical angle correction amount Δθc can be set to a larger value, whereby the loss of synchronism of the motor 20 can be avoided quickly. Meanwhile, in the case where the electrical angle of the δ-axis enters a region where the motor torque efficiency is low, the motor torque efficiency can be increased by correcting the estimative electrical angle at a stable control speed.

6. For calculation of the electrical angle correction amount Δθc, the correction sensitivity for the case where the electrical angle of the δ-axis leads the prescribed angular range A is set to be greater than the correction sensitivity for the case where the electrical angle of the δ-axis lags behind the prescribed angular range A. Therefore, in the case where the electrical angle of the δ-axis enters a region where the motor 20 is likely to lose synchronism, the electrical angle correction amount Δθc can be set to a larger value, whereby the loss of synchronism of the motor 20 can be avoided quickly. Meanwhile, in the case where the electrical angle of the δ-axis enters a region where the motor torque efficiency is low, the motor torque efficiency can be increased by correcting the estimative electrical angle at a stable control speed.

7. The angular range from the q-axis to the minimum delay electrical angle θmin is smaller than the prescribed angular range A (the angle θx from the minimum delay electrical angle θmin to the maximum delay electrical angle θmax). Accordingly, it is possible to maintain the motor torque efficiency as high as possible, while restraining the loss of synchronism of the motor 20.

8. At the time of calculation of the estimated inductive voltage e, the dead zone is not set for the inductive voltage e when the magnitude of the steering torque Tr is small. By virtue of this control, the estimative electrical angle is not fixed. Therefore, when a driver starts to turn the steering wheel 11 from its neutral position, the driver does not sense a resistance to the steering operation. Meanwhile, when the magnitude of the steering torque Tr is large, the dead zone is set for the inductive voltage e. By virtue of this control, the steering wheel 11 does not vibrate, whereby steering feeding is not impaired.

Next, a modification of the electrical angle estimation section 110 will be described. The electrical angle estimation section 110 according to this modification includes an electrical-angle-error detection section 117' and an electrical-angle-correction-amount computation section 118' (both the reference numerals are shown in FIG. 3 in the parenthesized form), instead of the electrical-angle-error detection section 117 and the electrical-angle-correction-amount computation section 118. Since the electrical-angle-error detection section 117 in the above-described embodiment calculates the detection value eγ/e corresponding to the electrical angle error Δθe, the electrical-angle-correction-amount computation section 118 can set the prescribed angular range A accurately. In contrast, the electrical-angle-error detection section 117' of the modification calculates the γ-axis inductive voltage eγ, and outputs the calculation result. In the case where the γ-axis inductive voltage eγ is used, although an accurate electrical angle error Δθe cannot be necessarily detected, the determination as to whether the δ-axis leads or lags behind the q-axis, or coincides with the q-axis can be made on the basis of the sign (positive or negative) of the γ-axis inductive voltage eγ. Also, the electrical angle difference of the δ-axis from the q-axis can be estimated from the magnitude of the γ-axis inductive voltage eγ.

Figure 15:
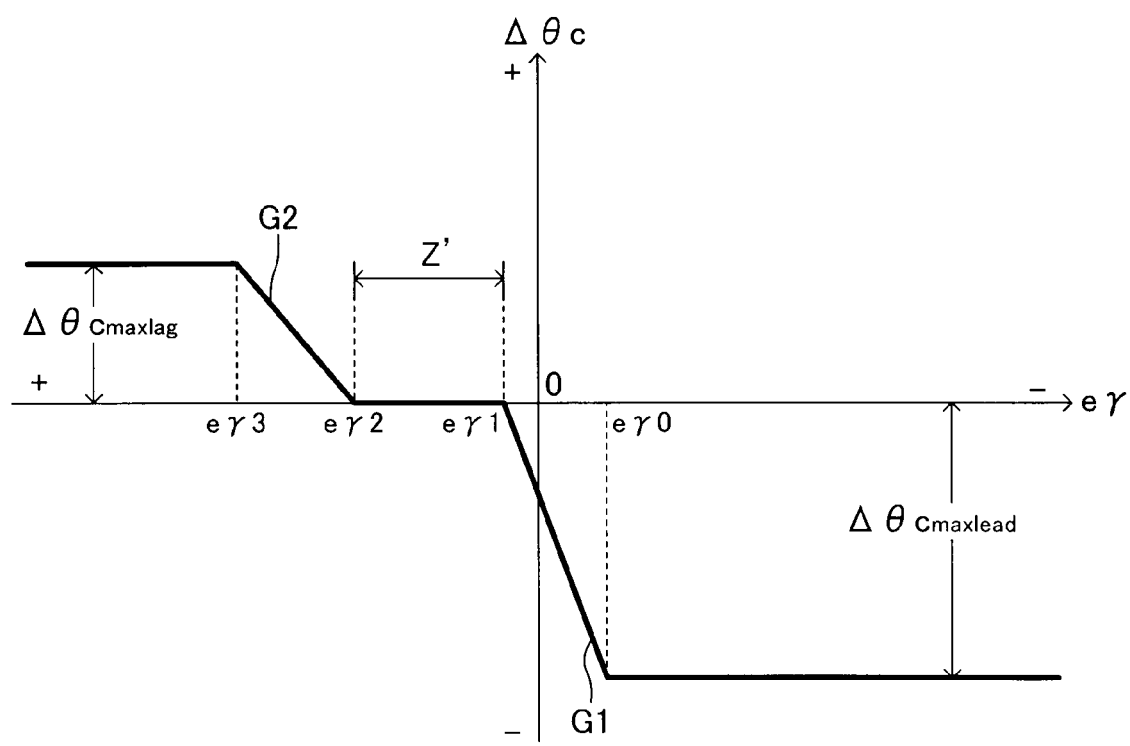
FIG. 15 is a graph showing a modification of the electrical-angle-correction-amount calculation map.

In view of the above, in this modification, the γ-axis inductive voltage eγ is calculated at the electrical-angle-error detection section 117', and is output to the electrical-angle-correction-amount computation section 118'. The electrical-angle-correction-amount computation section 118' calculates the electrical angle correction amount Δθc by making use of an electrical-angle-correction-amount calculation map shown in FIG. 15. This electrical-angle-correction-amount calculation map defines the relation between the γ-axis inductive voltage eγ and the electrical angle correction amount Δθc. In the electrical-angle-correction-amount calculation map used in this modification, a range between eγ 1 and eγ 2 (where the γ-axis inductive voltage eγ assumes a positive value) is a dead zone Z' where the electrical angle correction amount Δθc becomes zero. This dead zone Z' is determined in advance such that the δ-axis is located in the above-described angular range A at the highest possibility. eγ0, eγ1, eγ2, and eγ3 in FIG. 15 correspond to x0, x1, x2, and x3 of the above-described embodiment. Accordingly, the correction sensitivity and the upper limit of the electrical angle correction amount Δθc are set to respective values similar to those employed in the above-described embodiment. Thus, in this modification as well, the actions and effects similar to those of the above-described embodiment are attained.

In the above, the electric power steering apparatus of the present embodiment has been described. However, the present invention is not limited to the above-described embodiment, and may be changed in various ways without departing from the scope of the present invention.

For example, in the present embodiment, the estimative electrical angle is computed under the assumption that the direction of the steering torque Tr detected by the steering torque sensor 21 coincides with the rotational direction of the motor 20. However, in the case where, a sensor, such as a steering angle sensor, capable of detecting the rotational direction of the motor 20 is provided, the rotational direction of the motor 20 may be determined through use of a detection value output from that sensor.

In the present embodiment, the value of the actual electrical angle θea immediately before an anomaly of the rotational angle sensor 22 is detected is used as the initial value θeb(n−1) of the estimative electrical angle. However, an arbitrary value, such as a fixed value, may be used instead of the actual electrical angle θea. This is because, even in the case where the initial estimative electrical angle differs from the actual electrical angle, the permanent magnet is drawn toward the direction of the current vector and synchronized, while the motor 20 is rotating.

In the present embodiment, the upper limit of the electrical angle correction amount Δθc and the electrical angle correction sensitivity are set differently depending on whether the electrical angle of the δ-axis leads or lags behind the prescribed angular range A. However, they may be set to the same values irrespective of whether the electrical angle of the δ-axis leads or lags behind the prescribed angular range A.

In the present embodiment, the prescribed angular range A is provided, and the estimative electrical angle is corrected such that the electrical angle of the δ-axis falls within this angular range A. However, the estimative electrical angle may be corrected without use of the prescribed angular range A. In this case, the estimative electrical angle is corrected such that the electrical angle of the δ-axis lags behind the electrical angle of the q-axis by a predetermined angle.

In the present embodiment, the electric power steering apparatus is of a rack assist type in which the torque generated by the motor 20 is applied to the rack bar 14. However, the electric power steering apparatus may be of a column assist type in which the torque generated by a motor is applied to the steering shaft 12.

The invention claimed is:

1. An electric power steering apparatus comprising:
a permanent magnet synchronous motor provided in a steering mechanism and adapted to generate steering assist torque;
a rotational angle sensor for detecting an electrical angle of the permanent magnet synchronous motor;
sensor anomaly detection means for detecting an anomaly of the rotational angle sensor;
electrical angle estimation means, operable when the anomaly of the rotational angle sensor is detected by the sensor anomaly detection means, for estimating the electrical angle of the permanent magnet synchronous motor on the basis of an inductive voltage generated in the permanent magnet synchronous motor; and
motor control means for driving and controlling the permanent magnet synchronous motor in such a manner that, when the anomaly of the rotational angle sensor is not detected, the motor control means drives and controls the permanent magnet synchronous motor by performing current vector control while using a d-q coordinate system having a d-axis and a q-axis determined on the basis of the electrical angle detected by the rotational angle sensor, the d-axis coinciding with an extending direction of a magnetic field of a permanent magnet of the permanent magnet synchronous motor and the q-axis being orthogonal to the d-axis, and, when the anomaly of the rotational angle sensor is detected, the motor control means drives and controls the permanent magnet synchronous motor by performing current vector control while using a γ-δ coordinate system having a γ-axis and a δ-axis estimated as the d-axis and the q-axis, respectively, on the basis of the estimative electrical angle estimated by the electrical angle estimation means,
the electric power steering apparatus comprising:
electrical-angle-difference detection means for detecting a γ-axis inductive voltage, which is an inductive voltage generated in the γ-axis direction of the permanent magnet synchronous motor and for detecting a difference in electrical angle between the q-axis and the δ-axis on the basis of at least the γ-axis inductive voltage; and
estimative-electrical-angle correction means for correcting the estimative electrical angle estimated by the electrical angle estimation means, on the basis of the electrical angle difference detected by the electrical-angle-difference detection means, such that the electrical angle of the δ-axis lags behind the electrical angle of the q-axis.

2. An electric power steering apparatus according to claim 1, wherein the estimative-electrical-angle correction means corrects the estimative electrical angle estimated by the electrical angle estimation means such that the electrical angle of the δ-axis falls within a prescribed angular range lagging behind the q-axis in terms of electrical angle.

3. An electric power steering apparatus according to claim 2, wherein
the electrical-angle-difference detection means outputs a detection value corresponding to the difference in electrical angle between the q-axis and the δ-axis; and
the estimative-electrical-angle correction means sets a dead zone for the detection value output from the electrical-angle-difference detection means, the dead zone corresponding to the prescribed angular range, and is configured such that, when the detection value deviates from the dead zone, the estimative-electrical-angle correction means corrects the estimative electrical angle estimated by the electrical angle estimation means such that the electrical angle of the δ-axis falls within the prescribed angular range.

4. An electric power steering apparatus according to claim 3, wherein the estimative-electrical-angle correction means sets a correction sensitivity, which represents the ratio of an amount of correction of the estimative electrical angle to an amount of deviation of the detection value from the dead zone, such that, when the electrical angle of the δ-axis leads the prescribed angular range, the estimative-electrical-angle correction means sets the correction sensitivity to be higher than that in the case where the electrical angle of the δ-axis lags behind the prescribed angular range.

5. An electric power steering apparatus according to claim 2 or 3, wherein the estimative-electrical-angle correction means sets an upper limit for an amount of correction of the estimative electrical angle such that, when the electrical angle of the δ-axis leads the prescribed angular range, the estimative-electrical-angle correction means sets the upper limit to a greater value as compared with the case where the electrical angle of the δ-axis lags behind the prescribed angular range.

6. An electric power steering apparatus according to claim 2 or 3, wherein the prescribed angular range is an angular range extending from a first electrical angle which lags behind the q-axis by a minimum angle to a second electrical angle which lags behind the q-axis by a maximum angle, and an angular range extending from the q-axis to the first electrical angle is narrower than the prescribed angular range.

7. An electric power steering apparatus according to claim 6, wherein the second electrical angle is set within a range where a previously required steering assist performance is attained.

8. An electric power steering apparatus according to any one of claims 1 to 3, wherein
- the motor control means is connected to a steering torque sensor for detecting a steering torque input from a steering wheel to a steering shaft, and drives and controls the permanent magnet synchronous motor to generate a target steering assist torque set on the basis of the steering torque detected by the steering torque sensor; and
- the electrical angle estimation means estimates a rotational direction of the permanent magnet synchronous motor on the basis of the direction of the steering torque detected by the steering torque sensor, and calculates the estimative electrical angle by advancing the electrical angle in the rotational direction by an amount corresponding to the inductive voltage.

* * * * *